US012573748B2

(12) United States Patent
Nam et al.

(10) Patent No.: US 12,573,748 B2
(45) Date of Patent: Mar. 10, 2026

(54) ELECTRONIC DEVICE COMPRISING ANTENNA

(71) Applicant: Samsung Electronics Co., Ltd., Suwon-si (KR)

(72) Inventors: Hojung Nam, Suwon-si (KR); Kyoungmok Kim, Suwon-si (KR); Jaeho Lim, Suwon-si (KR); Myeongjun Kong, Suwon-si (KR); Soonho Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 42 days.

(21) Appl. No.: 18/781,686

(22) Filed: Jul. 23, 2024

(65) Prior Publication Data

US 2024/0380103 A1 Nov. 14, 2024

Related U.S. Application Data

(63) Continuation of application No. PCT/KR2023/000175, filed on Jan. 4, 2023.

(30) Foreign Application Priority Data

Jan. 28, 2022 (KR) ........................ 10-2022-0013359

(51) Int. Cl.
*H01Q 1/24* (2006.01)
*H01Q 1/38* (2006.01)
(Continued)

(52) U.S. Cl.
CPC ............... *H01Q 1/38* (2013.01); *H01Q 1/243* (2013.01); *H01Q 13/10* (2013.01); *H01R 13/2407* (2013.01)

(58) Field of Classification Search
CPC .......... H01Q 1/243; H01Q 5/30; H01Q 13/10; H04M 1/026; H04M 1/0277
See application file for complete search history.

(56) References Cited

U.S. PATENT DOCUMENTS 9,705,180 B2 7/2017 Darnell et al.
10,211,514 B2 2/2019 Jung et al.
(Continued)

FOREIGN PATENT DOCUMENTS

KR 101506500 B1 3/2015
KR 101528635 B1 6/2015
(Continued)

OTHER PUBLICATIONS

Extended European Search Report dated Apr. 3, 2025 issued in European Patent Application No. 23747195.8.
(Continued)

*Primary Examiner* — Jason M Crawford
(74) *Attorney, Agent, or Firm* — Nixon & Vanderhye, P.C.

(57) ABSTRACT

An electronic device according to an embodiment comprises: a printed circuit board; a first electronic component electrically connected to the printed circuit board; a second electronic component electrically connected to the printed circuit board and facing one side surface of the first electronic component; a first conductive plate including a feeding point supporting the first electronic component and electrically connected to the printed circuit board; a second conductive plate spaced apart from the first conductive plate and supporting the second electronic component; and a plurality of bridges connecting the first conductive plate with the second conductive plate to form a slot, wherein a wireless communication circuit may be configured to communicate with an external electronic device through at least
(Continued)

one frequency band using the first conductive plate and the second conductive plate.

20 Claims, 19 Drawing Sheets

(51) Int. Cl.
*H01Q 13/10* (2006.01)
*H01R 13/24* (2006.01)

(56) References Cited

U.S. PATENT DOCUMENTS

| | | | | |
|---|---|---|---|---|
| 11,246,229 | B2 | 2/2022 | Lee et al. | |
| 11,303,032 | B2 | 4/2022 | Jo et al. | |
| 11,736,139 | B2 | 8/2023 | Kwon et al. | |
| 12,407,089 | B2 * | 9/2025 | Leutheuser | G06F 1/1626 |
| 2009/0256759 | A1 * | 10/2009 | Hill | H01Q 9/06 343/702 |
| 2019/0260112 | A1 * | 8/2019 | Azad | H01Q 9/42 |
| 2020/0127404 | A1 * | 4/2020 | Seo | H01Q 5/42 |
| 2020/0267828 | A1 | 8/2020 | Moon | |
| 2020/0396871 | A1 | 12/2020 | Yun et al. | |
| 2021/0028543 | A1 * | 1/2021 | Yeom | H01Q 5/30 |
| 2021/0167492 | A1 | 6/2021 | Choe et al. | |
| 2021/0280981 | A1 | 9/2021 | Kim et al. | |
| 2021/0296766 | A1 | 9/2021 | Li | |
| 2021/0399429 | A1 * | 12/2021 | Garrido Lopez | H01Q 1/44 |
| 2022/0102852 | A1 * | 3/2022 | Irci | H04M 1/026 |
| 2022/0376386 | A1 * | 11/2022 | Lee | H05K 1/144 |
| 2023/0046925 | A1 * | 2/2023 | Jang | H01Q 9/42 |
| 2023/0112380 | A1 * | 4/2023 | Jang | H01Q 1/243 343/702 |
| 2023/0119307 | A1 * | 4/2023 | Jeon | H01Q 5/378 343/893 |
| 2023/0253992 | A1 * | 8/2023 | Yu | H01Q 5/328 343/702 |
| 2024/0178548 | A1 * | 5/2024 | Son | H01Q 1/24 |
| 2024/0250418 | A1 * | 7/2024 | Cho | H01Q 5/335 |
| 2024/0380103 | A1 * | 11/2024 | Nam | H01Q 5/30 |

FOREIGN PATENT DOCUMENTS

| | | | |
|---|---|---|---|
| KR | 101624559 | B1 | 5/2016 |
| KR | 20190060180 | A | 6/2019 |
| KR | 20200100973 | A | 8/2020 |
| KR | 20200101178 | A | 8/2020 |
| KR | 102152924 | B1 | 9/2020 |
| KR | 20210068919 | A | 6/2021 |
| KR | 20210102684 | A | 8/2021 |
| KR | 20220001206 | A | 1/2022 |
| KR | 102426656 | B1 | 7/2022 |
| KR | 20230052532 | A | 4/2023 |

OTHER PUBLICATIONS

International Search Report for PCT/KR2023/000175 mailed Apr. 11, 2023, 5 pages.

Written Opinion of the ISA for PCT/KR2023/000175 mailed Apr. 11, 2023, 3 pages.

* cited by examiner

510: 511, 512, 513
520: 521, 522
A1: 551, 552, 553

A1: 551, 552, 553

A1: 551, 552, 553

ELECTRONIC DEVICE COMPRISING ANTENNA

CROSS-REFERENCE TO RELATED APPLICATIONS

This application is a continuation of International Application No. PCT/KR2023/000175 designating the United States, filed on Jan. 4, 2023, in the Korean Intellectual Property Receiving Office and claiming priority to Korean Patent Application No. 10-2022-0013359, filed on Jan. 28, 2022, in the Korean Intellectual Property Office, the disclosures of each of which are incorporated by reference herein in their entireties.

BACKGROUND

Field

The disclosure relates to an electronic device including an antenna.

Description of Related Art

An electronic device may communicate with an external electronic device using an antenna for wireless communication. The electronic device such as a smartphone, a tablet, or a laptop uses various frequency bands for various types of communication with the external electronic device. The electronic device may provide an antenna structure capable of transmitting or receiving a signal of a plurality of frequency bands.

In order to support various frequency bands and various types of communication protocols, a number of antennas may be disposed in the electronic device. Due to the miniaturization of electronic devices, a mounting space of electronic devices including antennas therein may become insufficient.

SUMMARY

Embodiments of the disclosure may provide an electronic device including an antenna having a broadband radiation characteristic by utilizing a plurality of conductive plates supporting electronic components as an antenna radiator.

According to an example embodiment, an electronic device may comprise: a printed circuit board including at least one processor, comprising processing circuitry, a first electronic component electrically connected to the printed circuit board, a second electronic component electrically connected to the printed circuit board and facing a side of the first electronic component, a first conductive plate supporting the first electronic component, connected to at least one processor, and including a feeding point electrically connected to the printed circuit board, and a second conductive plate supporting the second electronic component and spaced apart from the first conductive plate.

According to an example embodiment, the electronic device may comprise a plurality of bridges connecting the first conductive plate and the second conductive plate and forming a slot.

According to an example embodiment, at least one processor, individually and/or collectively, may be configured to communicate with an external electronic device through at least one frequency band, using the first conductive plate and the second conductive plate.

According to an example embodiment, an electronic device may comprise: a housing including a plurality of conductive portions and a plurality of non-conductive portions disposed between the plurality of conductive portions, a bracket disposed in the housing, a printed circuit board including at least one processor, comprising processing circuitry, and supported by the bracket, a first electronic component electrically connected to the printed circuit board and disposed on the printed circuit board, a second electronic component electrically connected to the printed circuit board, disposed on the printed circuit board, and facing a side of the first electronic component, a first conductive plate supporting the first electronic component, electrically connected to the printed circuit board, and electrically disconnected from the plurality of the conductive portions, and a second conductive plate supporting the second electronic component, and spaced apart from the first conductive plate.

According to an example embodiment, at least one processor may be operably connected to the first conductive plate, and, individually and/or collectively, configured to communicate with an external electronic device in a first frequency band through the first conductive plate and the second conductive plate.

According to an example embodiment, at least one processor, individually and/or collectively, may be configured to communicate with the external electronic device in a second frequency band through at least one of the conductive portions.

An electronic device according to an example embodiment can provide a broadband antenna by connecting conductive plates inside the electronic device and utilizing them as a radiator.

The electronic device according to an example embodiment can eliminate and/or reduce interference concerns between the conductive plates by connecting conductive plates, which were coupled to each other when separated. As a short circuit point of the conductive plate and a metal housing used as an antenna radiator is removed, interference with the conductive plate can be reduced when the conductive portion of the housing operates as an antenna in a low frequency band.

The effects that can be obtained from the present disclosure are not limited to those described above, and any other effects not mentioned herein will be clearly understood by those having ordinary knowledge in the art to which the present disclosure belongs, from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
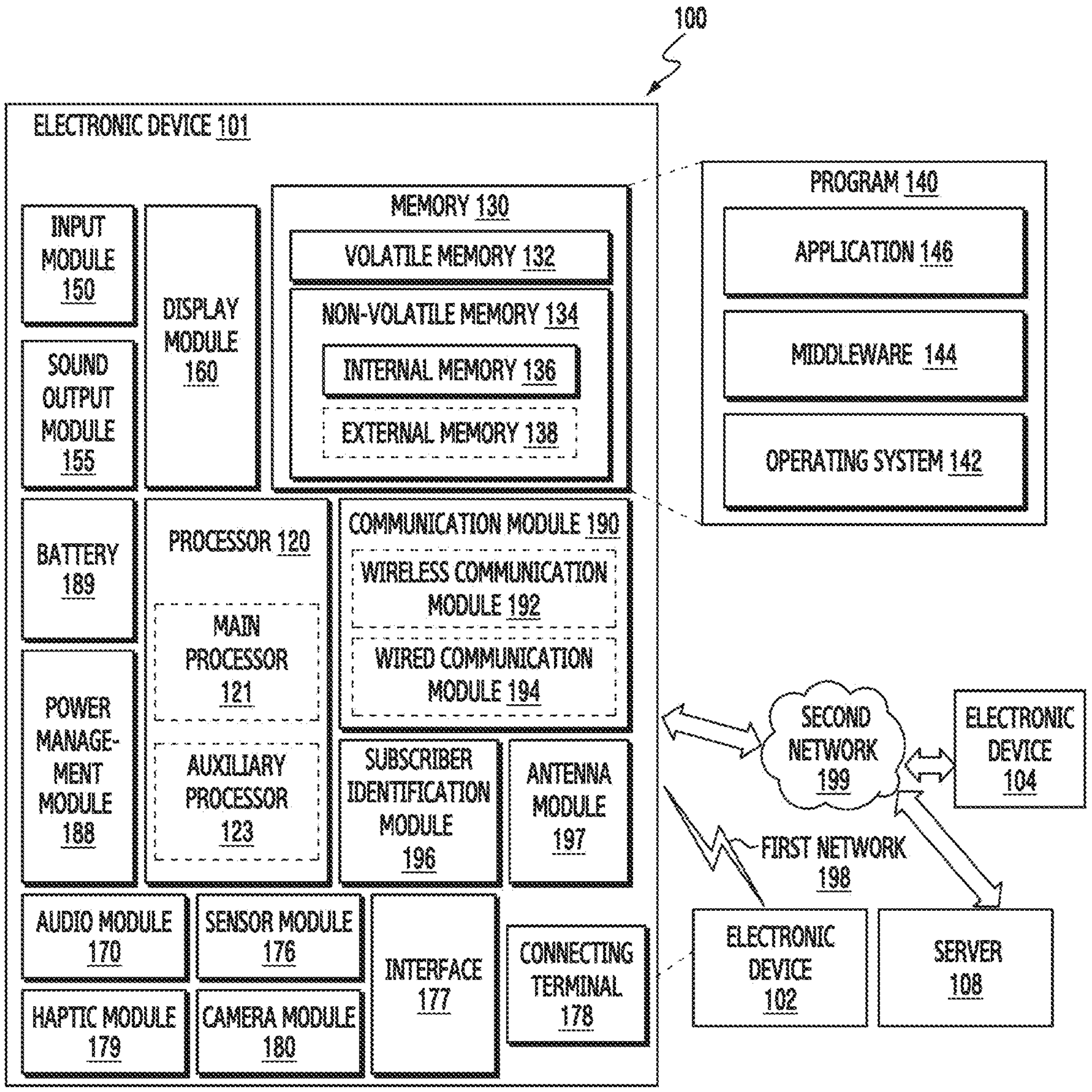
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
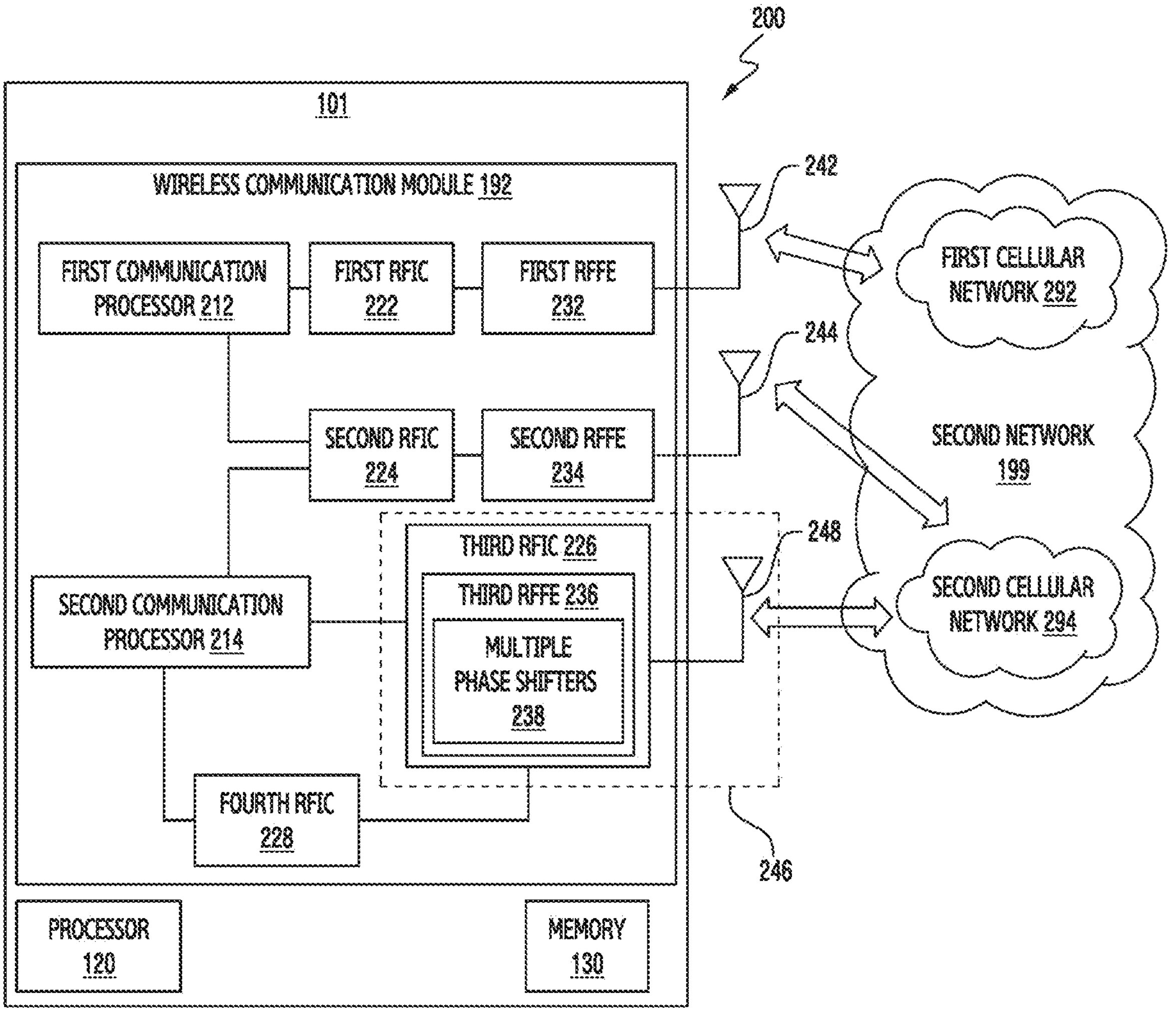
FIG. 2 is a block diagram illustrating an example configuration of an electronic device for supporting legacy network communication and 5G network communication, according to various embodiments.

FIG. 2 is a block diagram 200 illustrating an example configuration of the electronic device 101 for supporting legacy network communication and 5G network communication, according to various embodiments.

Referring to FIG. 2, the electronic device 101 may include a first communication processor (e.g., including processing circuitry) 212, a second communication processor (e.g., including processing circuitry) 214, a first radio frequency integrated circuit (RFIC) 222, a second RFIC 224, and a third RFIC 226, a fourth RFIC 228, a first radio frequency front end (RFFE) 232, a second RFFE 234, a first antenna module (e.g., including an antenna) 242, a second antenna module (e.g., including an antenna) 244, and an antenna 248. The electronic device 101 may further include the processor (e.g., including processing circuitry) 120 and the memory 130. The second network 199 may include a first cellular network 292 and a second cellular network 294. According to an embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may include at least a part of a wireless communication module 192. According to an embodiment, the fourth RFIC 228 may be omitted or may be included as a part of the third RFIC 226.

The first communication processor 212 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The first communication processor 212 may support the establishment of a communication channel of a band to be used for wireless communication with the first cellular network 292 and legacy network communication through the established communication channel. According to various embodiments, the first cellular network 292 may be a legacy network including a 2nd generation (2G), 3rd generation (3G), 4th generation (4G), and/or long-term evolution (LTE) network. The second communication processor 214 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The second communication processor 214 may support the establishment of a communication channel corresponding to a specified band (e.g., approximately 6 GHz to 60 GHz) among bands to be used for wireless communication with the second cellular network 294, and 5G network communication through the established communication channel. According to various embodiments, the second cellular network 294 may be a 5G network defined by 3GPP. Additionally, according to an embodiment, the first communication processor 212 or the second communication processor 214 may support the establishment of a communication channel corresponding to another specified band (e.g., approximately 6 GHz or less) among bands to be used for wireless communication with the second cellular network 294, and 5G network communication through the established communication channel. According to an embodiment, the first communication processor 212 and the second communication processor 214 may be implemented in a single chip or a single package. According to various embodiments, the first communication processor 212 or the second communication processor 214 may be formed with the processor 120, the coprocessor 123 of FIG. 1, or the communication module 190 in a single chip or a single package.

Upon transmission, the first RFIC 222 may convert a baseband signal generated by the first communication processor 212 into a radio frequency (RF) signal of approximately 700 MHz to approximately 3 GHz used in the first cellular network 292 (e.g., a legacy network). Upon reception, an RF signal may be obtained from the first cellular network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal so as to be processed by the first communication processor 212.

Upon transmission, the second RFIC 224 may convert a baseband signal generated by the first communication processor 212 or the second communication processor 214 into an RF signal (hereinafter, referred to as a 5G Sub6 RF signal) of the Sub6 band (e.g., approximately 6 GHz or less) used in the second cellular network 294 (e.g., the 5G network). Upon reception, a 5G Sub6 RF signal may be obtained from the second cellular network 294 (e.g., the 5G network) through an antenna (e.g., the second antenna module 244), and may be preprocessed through an RFFE (e.g., the second RFFE 234). The second RFIC 224 may convert the preprocessed 5G Sub6 RF signal into a baseband signal so as to be processed by a corresponding one of the first communication processor 212 or the second communication processor 214.

The third RFIC 226 may convert a baseband signal generated by the second communication processor 214 into an RF signal (hereinafter, referred to as a 5G Above6 RF signal) of the 5G Above6 band (e.g., approximately 6 GHz to approximately 60 GHz) to be used in the second cellular network 294 (e.g., the 5G network). Upon reception, a 5G Above6 RF signal may be obtained from the second cellular network 294 (e.g., the 5G network) through an antenna (e.g., the antenna 248), and may be preprocessed through the third RFFE 236. For example, the third RFFE 236 may perform preprocessing of the signal using a phase shifter 238. The third RFIC 226 may convert the preprocessed 5G Above6 RF signal into a baseband signal so as to be processed by the second communication processor 214. According to an embodiment, the third RFFE 236 may be formed as a part of the third RFIC 226.

According to an embodiment, the electronic device 101 may include the fourth RFIC 228 separately from or at least as a part of the third RFIC 226. In this case, the fourth RFIC 228 may convert the baseband signal generated by the second communication processor 214 into an RF signal (hereinafter, referred to as an intermediate frequency (IF) signal) of an intermediate frequency band (e.g., approximately 9 GHz to approximately 11 GHz), and then transmit the IF signal to the third RFIC 226. The third RFIC 226 may convert the IF signal into a 5G Above6 RF signal. Upon reception, a 5G Above6 RF signal may be received from the second cellular network 294 (e.g., the 5G network) through an antenna (e.g., the antenna 248), and may be converted into an IF signal by the third RFIC 226. The fourth RFIC 228 may convert the IF signal into the baseband signal so as to be processed by the second communication processor 214.

According to an embodiment, the first RFIC 222 and the second RFIC 224 may be implemented as a single chip or at least a part of a single package. According to an embodiment, the first RFFE 232 and the second RFFE 234 may be implemented as a single chip or at least a part of a single package. According to an embodiment, at least one of the first antenna module 242 or the second antenna module 244 may be omitted or combined with another antenna module to process RF signals of a plurality of corresponding bands.

According to an embodiment, the third RFIC 226 and the antenna 248 may be disposed on the same substrate to form a third antenna module 246. For example, the wireless communication module 192 or the processor 120 may be disposed on a first substrate (e.g., a main PCB). In this case, the third RFIC 226 may be disposed in a partial region (e.g., the lower surface) of a second substrate (e.g., a sub PCB) separate from the first substrate, and the antenna 248 may be disposed in another partial region (e.g., the upper surface) to form the third antenna module 246. According to an embodiment, the antenna 248 may include, for example, an antenna array that may be used for beamforming. By disposing the third RFIC 226 and the antenna 248 on the same substrate, it is possible to reduce the length of the transmission line therebetween. This, for example, may reduce the loss (e.g., attenuation) of a signal in a high frequency band (e.g., approximately 6 GHz to approximately 60 GHz) used for 5G network communication by the transmission line. Accordingly, the electronic device 101 may improve the quality or speed of communication with the second cellular network 294 (e.g., the 5G network).

The second cellular network 294 (e.g., the 5G network) may be operated independently of (e.g., Stand-Alone (SA)) or operated to be connected to (e.g., Non-Stand Alone (NSA)) the first cellular network 292 (e.g., the legacy network). For example, in the 5G network, there may be only an access network (e.g., 5G radio access network (RAN) or next-generation RAN (NG RAN)) and no core network (e.g., next-generation core (NGC)). In this case, after accessing the access network of the 5G network, the electronic device 101 may access an external network (e.g., the Internet) under the control of a core network (e.g., evolved packed core (EPC)) of the legacy network. Protocol information for communication with the legacy network (e.g., LTE protocol information) or protocol information for communication with the 5G network (e.g., New Radio (NR) protocol information) may be stored in the memory 230 and may be accessed by other components (e.g., the processor 120, the first communication processor 212, or the second communication processor 214).

Figure 3:
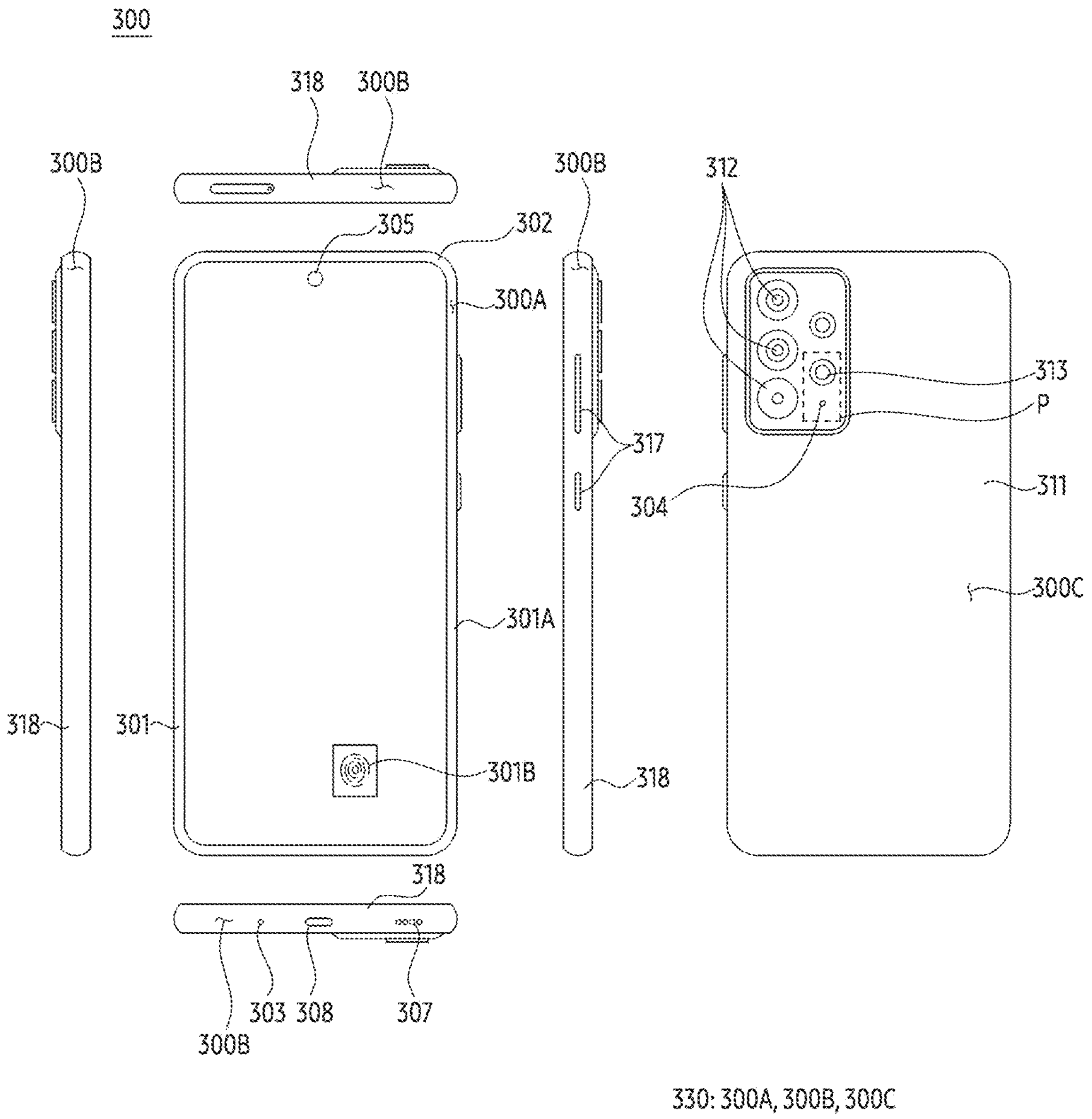
FIG. 3 is a diagram illustrating an example electronic device according to various embodiments.
Figure 4:
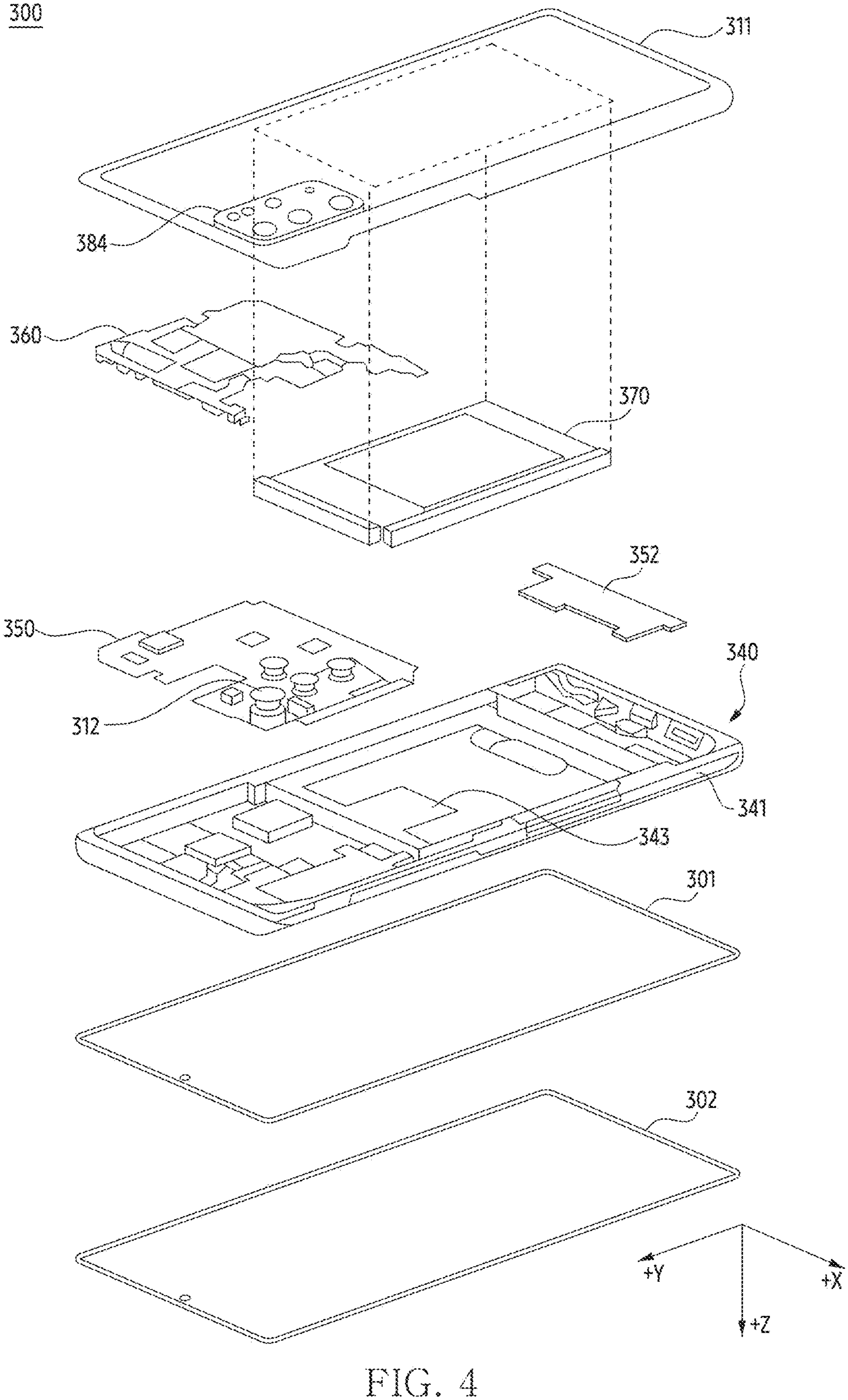
FIG. 4 is an exploded perspective view of an electronic device according to various embodiments.

FIG. 3 is a diagram illustrating an electronic device according to various embodiments, and FIG. 4 is an exploded perspective view of an electronic device according to various embodiments.

Referring to FIG. 3, an electronic device 300 (e.g., the electronic device 101 of FIG. 1) according to an embodiment may include a housing 330 forming an exterior of the electronic device 300. For example, the housing 330 may include a first surface (or front surface) 300A, a second surface (or rear surface) 300C, and a third surface (or side 300B) surrounding a space between the first surface 300A and the second surface 300C. In an embodiment, the housing 330 may refer to a structure (e.g., a frame structure 340 of FIG. 4) forming at least a portion of the first surface 300A, the second surface 300C, and/or the third surface 300B.

The electronic device 300 according to an embodiment may include a substantially transparent front plate 302. In an embodiment, the front plate 302 may form at least a portion of the first surface 300A. In an embodiment, the front plate 302 may include, for example, a glass plate or a polymer plate, which include various coating layers, but is not limited thereto.

The electronic device 300 according to an embodiment may include a substantially opaque rear plate 311. In an embodiment, the rear plate 311 may form at least a portion of the second surface 300C. In an embodiment, the rear plate 311 may be formed of coated or colored glass, ceramic, polymer, metal (e.g., aluminum, stainless steel (STS), or magnesium), or a combination of at least two of the materials.

The electronic device 300 according to an embodiment may include a side bezel structure (or a side member) 318 (e.g., a sidewall 341 of the frame structure 340 of FIG. 4). In an embodiment, the side bezel structure 318 may be coupled with the front plate 302 and/or the rear plate 311 to form at least a portion of the third surface 300B of the electronic device 300. For example, the side bezel structure 318 may form the entire third surface 300B of the electronic device 300, or for another example, the side bezel structure 318 may form the third surface 300B of the electronic device 300 together with the front plate 302 and/or the rear plate 311.

Unlike the illustrated embodiment, when the third surface 300B of the electronic device 300 is partially formed by the front plate 302 and/or the rear plate 311, the front plate 302 and/or the rear plate 311 may include an area that is curved toward the rear plate 311 and/or the front plate 302 at its edge and seamlessly extends. For example, the extending area of the front plate 302 and/or the rear plate 311 may be located at both ends of a long edge of the electronic device 300, but is not limited to the above-described example.

In an embodiment, the side bezel structure 318 may include a metal and/or a polymer. In an embodiment, the rear plate 311 and the side bezel structure 318 may be integrally formed, and may include the same material (e.g., a metallic material such as aluminum), but are not limited thereto. For example, the rear plate 311 and the side bezel structure 318 may be formed in separate configurations and/or may include different materials.

In an embodiment, the electronic device 300 may include at least one of a display 301, audio modules 303, 304, and 307, a sensor module (not illustrated), camera modules 305, 312, and 313, a key input device 317, a light emitting element (not illustrated), and/or a connector hole 308. In an embodiment, the electronic device 300 may omit at least one of the components (e.g., key input device 317 or light emitting device (not illustrated), or may additionally include another component.

In an embodiment, the display 301 (e.g., the display module 160 of FIG. 1) may be visible through a significant portion of the front plate 302. For example, at least a portion of the display 301 may be viewed through the front plate 302 forming the first surface 300A. In an embodiment, the display 301 may be disposed on a back surface of the front plate 302.

In an embodiment, an outer shape of the display 301 may be formed generally the same as an outer shape of the front plate 302 adjacent to the display 301. In an embodiment, a distance between an outer periphery of the display 301 and an outer periphery of the front plate 302 may be formed generally the same, in order to expand an area in which the display 301 is visible.

In an embodiment, the display 301 (or the first surface 300A of the electronic device 300) may include a screen display area 301A. In an embodiment, the display 301 may provide visual information to the user through the screen display area 301A. In an illustrated embodiment, when the first surface 300A is viewed from the front, the screen display area 301A is illustrated to be spaced apart from the outer periphery of the first surface 300A and located inside the first surface 300A, but it is not limited thereto. In an embodiment, when the first surface 300A is viewed from the front, at least a portion of an edge of the screen display area 301A may substantially match an edge of the first surface 300A (or the front plate 302).

In an embodiment, the screen display area 301A may include a sensing area 301B configured to obtain the user's biometric information. Herein, the meaning of "the screen display area 301A includes the sensing area 301B" may be understood as indicating that at least a portion of the sensing area 301B overlaps the screen display area 301A. For example, the sensing area 301B may refer, for example, to an area capable of displaying visual information by the display 301 like other areas of the screen display area 301A, and additionally obtaining the user's biometric information (e.g., fingerprint). In an embodiment, the sensing area 301B may be formed in the key input device 317.

In an embodiment, the display 301 may include an area in which a first camera module 305 (e.g., the camera module 180 of FIG. 1) is located. In an embodiment, an opening is formed in the area of the display 301, and the first camera module 305 (e.g., a punch hole camera) may be at least partially disposed in the opening in order to face the first surface 300A. In this case, the screen display area 301A may surround at least a portion of an edge of the opening. In an embodiment, the first camera module 305 (e.g., an under display camera (UDC)) may be disposed under the display 301 to overlap the area of the display 301. In this case, the display 301 may provide visual information to the user through the area, and additionally, the first camera module 305 may obtain an image corresponding to a direction toward the first surface 300A through the area of the display 301.

In an embodiment, the display 301 may be combined or disposed adjacent to a touch sensing circuit, a pressure sensor capable of measuring the intensity (pressure) of a touch, and/or a digitizer detecting a magnetic field type stylus pen.

In an embodiment, the audio modules 303, 304, and 307 (e.g., the audio module 170 of FIG. 1) may include microphone holes 303 and 304 and a speaker hole 307.

In an embodiment, the microphone holes 303 and 304 may include a first microphone hole 303 formed in a partial area of the third surface 300B and a second microphone hole 304 formed in a partial area of the second surface 300C. A microphone (not illustrated) for obtaining external sound may be disposed inside the microphone holes 303 and 304. The microphone may include a plurality of microphones to detect a direction of sound.

In an embodiment, the second microphone hole 304 formed in a partial area P of the second surface 300C may be disposed adjacent to the camera modules 305, 312, and 313. For example, the second microphone hole 304 may obtain a sound according to an operation of the camera modules 305, 312, and 313. However, it is not limited thereto.

In an embodiment, the speaker hole 307 may include an external speaker hole 307 and a receiver hole for a call (not illustrated). The external speaker hole 307 may be formed on a portion of the third surface 300B of the electronic device 300. In an embodiment, the external speaker hole 307 and the microphone hole 303 may be implemented as one hole. Although not illustrated, a receiver hole for a call (not illustrated) may be formed on another portion of the third surface 300B. For example, the receiver hole for a call may be formed on an opposite side of the external speaker hole 307 on the third surface 300B. For example, based on the illustration of FIG. 2, the external speaker hole 307 may be formed on the third surface 300B corresponding to a lower end of the electronic device 300, and the receiver hole for a call may be formed on the third surface 300B corresponding to an upper end of the electronic device 300. However, it is not limited thereto, and in an embodiment, the receiver hole for a call may be formed in a location other than the third surface 300B. For example, the receiver hole for a call may be formed by a separated space between the front plate 302 (or the display 301 and the side bezel structure 318.

In an embodiment, the electronic device 300 may include at least one speaker (not illustrated) configured to output sound to the outside of the housing 330 through the external speaker hole 307 and/or the receiver hole for a call (not illustrated).

In an embodiment, the sensor module (not illustrated) (e.g., the sensor module 176 of FIG. 1) may generate an electrical signal or a data value corresponding to an operating state inside the electronic device 300 or an external environmental state. For example, the sensor module may include at least one of a proximity sensor, an HRM sensor, a fingerprint sensor, a gesture sensor, a gyro sensor, a barometric sensor, a magnetic sensor, an acceleration sensor, a grip sensor, a color sensor, an infrared (IR) sensor, a biometric sensor, a temperature sensor, a humidity sensor, or an illuminance sensor.

In an embodiment, the camera modules 305, 312, and 313 (e.g., the camera module 180 of FIG. 1) may include a first camera module 305 disposed toward the first surface 300A of the electronic device 300, a second camera module 312 disposed toward the second surface 300C, and a flash 313.

In an embodiment, the second camera module 312 may include a plurality of cameras (e.g., dual cameras, triple cameras, or quad cameras). However, the second camera module 312 is not necessarily limited to including the plurality of cameras, and may include one camera.

In an embodiment, the first camera module 305 and the second camera module 312 may include one or more lenses, an image sensor, and/or an image signal processor.

In an embodiment, the flash 313 may include, for example, a light emitting diode or a xenon lamp. In an embodiment, two or more lenses (infrared cameras, wide-angle and telephoto lenses) and image sensors may be disposed on a surface of the electronic device 300.

In an embodiment, the key input device 317 (e.g., the input module 150 of FIG. 1) may be disposed on the third surface 300B of the electronic device 300. In an embodiment, the electronic device 300 may not include some or all of the key input devices 317, and the key input device 317, which is not included, may be implemented in another form, such as a soft key, on the display 301.

In an embodiment, the connector hole 308 may be formed on the third surface 300B of the electronic device 300 to accommodate a connector of an external device. A connection terminal (e.g., the connecting terminal 178 of FIG. 1) electrically connected to the connector of the external device may be disposed in the connector hole 308. The electronic device 300 according to an embodiment may include an interface module (e.g., the interface 177 of FIG. 1) for processing an electrical signal transmitted and received through the connection terminal.

According to an embodiment, the electronic device 300 may include a light emitting element (not illustrated). For example, the light emitting element (not illustrated) may be disposed on the first surface 300A of the housing 330. The light emitting device (not illustrated) may provide state information of the electronic device 300 in an optical form. In an embodiment, the light emitting element (not illustrated) may provide a light source linked with an operation of the first camera module 305. For example, the light emitting element (not illustrated) may include an LED, an IR LED, and/or a xenon lamp.

FIG. 4 is an exploded perspective view of an electronic device according to various embodiments.

Hereinafter, overlapping descriptions of configurations having the same reference numerals as the above-described configurations may not be repeated.

Referring to FIG. 4, an electronic device 300 according to an embodiment may include a frame structure 340, a first printed circuit board 350, a second printed circuit board 352, a cover plate 360, and a battery 370.

In an embodiment, the frame structure 340 may include a sidewall 341 forming an exterior (e.g., the third surface 300B of FIG. 2) of the electronic device 300 and a support portion 343 extending inward from the sidewall 341. In an embodiment, the frame structure 340 may be disposed between the display 301 and the rear plate 311. In an embodiment, the sidewall 341 of the frame structure 340 may surround a space between the rear plate 311 and the front plate 302 (and/or the display 301), and the support portion 343 of the frame structure 340 may extend from the sidewall 341 within the space.

In an embodiment, the frame structure 340 may support or accommodate other components included in the electronic device 300. For example, the display 301 may be disposed on a surface of the frame structure 340 facing a direction (e.g., +z direction), and the display 301 may be supported by the support portion 343 of the frame structure 340. For another example, the first printed circuit board 350, the second printed circuit board 352, the battery 370, a second camera module 312 may be disposed on another surface of the frame structure 340 facing another direction (e.g., the −z direction) opposite to the direction. The first printed circuit board 350, the second printed circuit board 352, the battery 370, and the second camera module 312 may be respectively seated in recesses defined by the sidewall 341 and/or the support portion 343 of the frame structure 340.

In an embodiment, the first printed circuit board 350, the second printed circuit board 352, and the battery 370 may be coupled to the frame structure 340, respectively. For example, the first printed circuit board 350 and the second printed circuit board 352 may be fixedly disposed in the frame structure 340 through a coupling member such as a screw. For example, the battery 370 may be fixedly disposed in the frame structure 340 through an adhesive member (e.g., a double-sided tape). However, it is not limited to the above-described example.

In an embodiment, the cover plate 360 may be disposed between the first printed circuit board 350 and the rear plate 311. In an embodiment, the cover plate 360 may be disposed on the first printed circuit board 350. For example, the cover plate 360 may be disposed on a surface of the first printed circuit board 350 facing the −z direction.

In an embodiment, the cover plate 360 may at least partially overlap the first printed circuit board 350, with respect to the z axis. In an embodiment, the cover plate 360 may cover at least a portion of an area of the first printed circuit board 350. Accordingly, the cover plate 360 may protect the first printed circuit board 350 from physical impact, or prevent or block a connector (e.g., the connector 34 of FIG. 3) coupled to the first printed circuit board 350 from being separated.

In an embodiment, the cover plate 360 may be fixedly disposed in the first printed circuit board 350 through a coupling member (e.g., a screw), or may be coupled to the frame structure 340 together with the first printed circuit board 350 through the coupling member.

In an embodiment, the display 301 may be disposed between the frame structure 340 and the front plate 302. For example, the front plate 302 may be disposed on a side (e.g., +z direction) of the display 301, and the frame structure 340 may be disposed on another side (e.g., −z direction).

In an embodiment, the front plate 302 may be coupled to the display 301. For example, the front plate 302 and the display 301 may be adhered to each other through an optical adhesive member (e.g., optically clear adhesive (OCA) or optically clear resin (OCR)) interposed therebetween.

In an embodiment, the front plate 302 may be coupled to the frame structure 340. For example, the front plate 302 may include an outer portion extending outside the display 301 when viewed in the z-axis direction, and adhere to the frame structure 340 through an adhesive member (e.g., a double-sided tape) disposed between the outer portion of the front plate 302 and the frame structure 340 (e.g., the sidewall 341). However, it is not limited to the above-described example.

In an embodiment, a processor (e.g., the processor 120 of FIG. 1), a memory (e.g., the memory 130 of FIG. 1), and/or an interface (e.g., the interface 177 of FIG. 1) may be equipped in the first printed circuit board 350 and/or the second printed circuit board 352. For example, the processor may include one or more of a central processing unit, an application processor, a graphic processing unit, an image signal processor, a sensor hub processor, or a communication processor. For example, the memory may include a volatile memory or a non-volatile memory. For example, the interface may include a high definition multimedia interface (HDMI), a universal serial bus (USB), an SD card interface, and/or an audio interface. The interface may electrically or physically connect the electronic device 300 to an external electronic device, and may include a USB connector, an SD card/MMC connector, or an audio connector. In an embodiment, the first printed circuit board 350 and the second printed circuit board 352 may be operably or electrically connected to each other through a connector (e.g., a flexible printed circuit board).

In an embodiment, the battery 370 may supply power to at least one component of the electronic device 300. For example, the battery 370 may include a rechargeable secondary battery or a fuel cell. At least a portion of the battery 370 may be disposed on substantially the same plane as the first printed circuit board 350 and/or the second printed circuit board 352.

The electronic device 300 according to an embodiment may include an antenna module (not illustrated) (e.g., the antenna module 197 of FIG. 1). In an embodiment, the antenna module may be disposed between the rear plate 311 and the battery 370. For example, the antenna module may include a near field communication (NFC) antenna, a wireless charging antenna, and/or a magnetic secure transmission (MST) antenna. For example, the antenna module may perform short-range communication with an external device or wirelessly transmit and receive power with the external device.

In an embodiment, the first camera module 305 (e.g., the front camera) may be disposed in at least a portion (e.g., the support portion 343) of the frame structure 340 so that a lens may receive external light through a partial area (e.g., a camera area 384) of the front plate 302 (e.g., the front surface 300A of FIG. 2).

In an embodiment, the second camera module 312 (e.g., the rear camera) may be disposed between the frame structure 340 and the rear plate 311. In an embodiment, the second camera module 312 may be electrically connected to the first printed circuit board 350 through a connection member (e.g., the connector). In an embodiment, the second camera module 312 may be disposed so that a lens may receive external light through the camera area 384 of the rear plate 311 of the electronic device 300.

In an embodiment, the camera area 384 may be formed on a surface (e.g., the rear surface 300C of FIG. 2) of the rear plate 311. In an embodiment, the camera area 384 may be formed to be at least partially transparent so that external light may be incident on the lens of the second camera module 312. In an embodiment, at least a portion of the camera area 384 may protrude from a surface of the rear plate 311 by a predetermined height. However, it is not limited thereto, and in an embodiment, the camera area 384 may form substantially the same plane as the surface of the rear plate 311.

In an embodiment, the housing 330 of the electronic device 300 may refer, for example, to a configuration or structure forming at least a portion of the exterior of the electronic device 300. In this regard, at least a portion of the front plate 302, the frame structure 340, and/or the rear plate 311, which are forming the exterior of the electronic device 300, may be referred to as the housing 330 of the electronic device 300.

Figure 5:
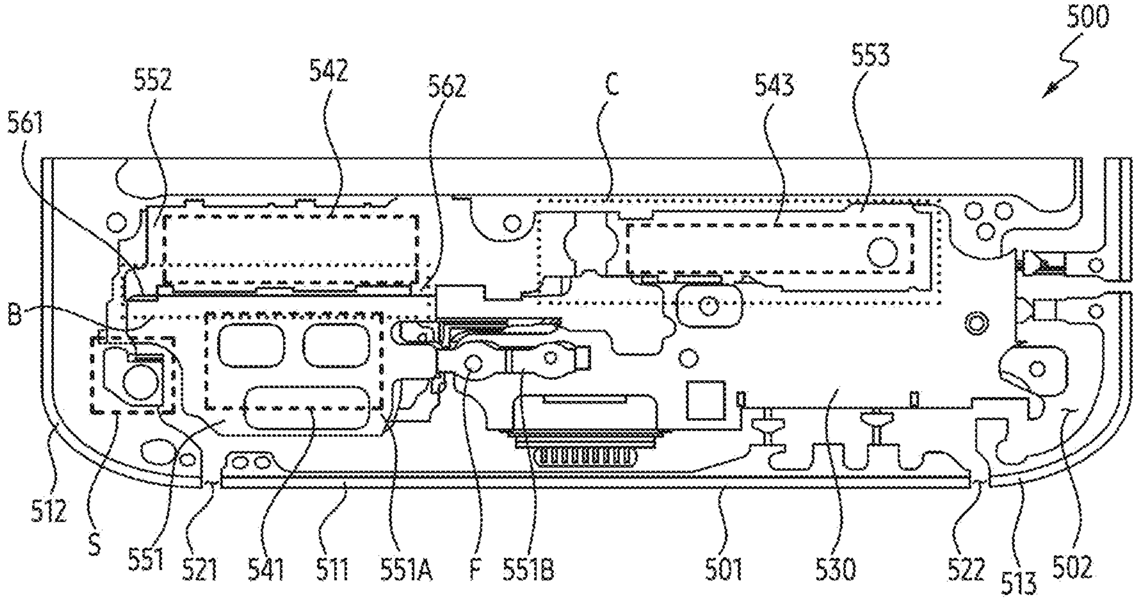
FIG. 5 is a diagram illustrating an example of an electronic device in which the housing, the printed circuit board, and the conductive plate of FIG. 4 are coupled according to various embodiments.

FIG. 5 is a diagram illustrating an example of an electronic device in which the housing, the printed circuit board, and the conductive plate of FIG. 4 are coupled according to various embodiments.

Referring to FIG. 5, an electronic device 500 (e.g., the electronic device 101 of FIG. 1 or the electronic device 300 of FIG. 3) may include components including a printed circuit board (e.g., the first printed circuit board 350 or the second printed circuit board 352 of FIG. 4), a first electronic component 541, a second electronic component 542, a first conductive plate 551, a second conductive plate 552, and/or a plurality of bridges 561 and 562. According to an embodiment, the electronic device 500 may further include a housing 501 (e.g., the housing 330 of FIG. 3) that provides an internal space 502 for accommodating the components.

The housing 501 may include a plurality of segmented conductive portions 511, 512, and 513 and non-conductive portions 521 and 522 disposed between the conductive portions. Each of the plurality of segmented conductive portions 511 and 512 may operate as an antenna by a wireless communication circuitry, a processor (e.g., the processor 120 of FIG. 1, the first communication processor 212 of FIG. 2, or the second communication processor 214 of FIG. 2)), which are disposed on the printed circuit board 530, or a processor disposed on another printed circuit board distinct from the printed circuit board 530.

According to an embodiment, the electronic components 541, 542, and 543 may be electrically connected to the printed circuit board 530. The first electronic component 541 may be disposed closer to the plurality of conductive portions 511 and 512 than the second electronic component 542 or the third electronic component 543. The second electronic component 542 may be disposed spaced apart from the first electronic component 541. The first electronic component 541, the second electronic component 542, or the third electronic component 543 may be one of a speaker module, a motor, or a cable to cable (CTC) connector. The first electronic component 541, the second electronic component 542, and the third electronic component 543 may require conductive plates 551, 552, and 553, which is a heat radiation structure or a structure for fixing.

According to an embodiment, a first conductive plate 551, a second conductive plate 552, and a third conductive plate 553 supporting the electronic components 541, 542, and 543 may be disposed in the housing 501. For example, the first conductive plate 551 may support the first electronic component 541, which is a speaker. The first conductive plate 551 may prevent and/or reduce vibration due to a resonance chamber of the speaker from being transmitted to another electronic component, and diffuse heat generated in the speaker. The second conductive plate 552 may support the second electronic component 542, which is a motor. The second conductive plate 552 may provide a structure for reducing vibration due to a rotation of the motor. The third conductive plate 553 may support the third electronic component 543, which is a cable. The third conductive plate 553 may provide a structure for pressing and fixing the cable.

According to an embodiment, the first conductive plate 551, the second conductive plate 552, the third conductive plate 553, or a combination thereof may be used as an antenna radiator. The first conductive plate 551, the second conductive plate 552, and the third conductive plate 553 may be connected to each other, in order to be used as a single antenna radiator. The first conductive plate 551, the second conductive plate 552, and the third conductive plate 553 may be disposed to overlap an area on which the first electronic component 541, the second electronic component 542, and the third electronic component 543 are disposed. According to an embodiment, the electronic device 500 may include insulation members (not illustrated) disposed between conductive plates 551, 552, and 553 and electronic components 541, 542, and 542 overlapping each of the conductive plates 551, 552, and 553. The insulation members may space each of the conductive plates 551, 552, and 553 from each of the electronic components 541, 542, and 542 overlapping each of the conductive plates 551, 552, and 553. Conductive plates 551, 552, and 553 may operate as an antenna radiator by being spaced apart from electronic components 541, 542, and 543.

According to an embodiment, the first conductive plate 551, the second conductive plate 552, and the third conductive plate 553 may be disposed close to each other. For example, the first conductive plate 551 disposed to overlap the first electronic component 541 may be disposed adjacent to the second conductive plate 552 disposed to overlap the second electronic component 542. The second conductive plate 552 may be disposed adjacent to the third conductive plate 553 disposed to overlap the third electronic component 543. The first conductive plate 551, the second conductive plate 552, and the third conductive plate 553 may be related to locations of the first electronic component 541, the second electronic component 542, and the third electronic component 543. Changing shapes of the first conductive plate 551, the second conductive plate 552, and the third conductive plate 553 may be difficult due to restrictions on the locations. For example, since the first conductive plate 551 forms the resonance chamber of the speaker, which is the first electronic component 541, it should be located on the first electronic component 541. Since the first electronic component 541 and the second electronic component 542 have different heights, it may be difficult for the first conductive plate 551 and the second conductive plate 552 to be formed as one plate. In order to integrally form the first conductive plate 551 and the second conductive plate 552, the first conductive plate 551 may be connected to an area of the second conductive plate 552 facing the first conductive plate 551. The first conductive plate 551 and the second conductive plate 552 may be connected using welding, bonding, or an additional conductive plate.

According to an embodiment, the first conductive plate 551 may include a body portion 551A and an extension portion 551B. The body portion 551A may be disposed to overlap the first electronic component 541. The extension portion 551B may extend from a side of the body portion 551A facing the printed circuit board 530 to the printed circuit board 530. A portion of the extension portion 551B may be disposed to overlap the printed circuit board 530. The extension portion 551B may include a feeding point F capable of transmitting and receiving a RF signal by being electrically connected to a wireless communication circuitry. Through the feeding point, the conductive plates 551, 552, and 553 may operate as an antenna radiator.

According to an embodiment, the second conductive plate 552 or the third conductive plate 553, which are electrically connected to the first conductive plate 551, may be electrically connected to the printed circuit board 530 for grounding. In order to reduce the influence of the first conductive portion 511 operated as an antenna, a distance between a ground portion for grounding the printed circuit board and the first conductive portion 511 may be greater than a distance between the first conductive plate 551 and the first conductive portion 511. Since the first conductive plate 551 is not grounded through an area S close to the conductive portions 511 and 512 located around the first conductive plate 551, the influence of the conductive portions 511 and 512 may be reduced. For example, when the first conductive plate 551 and the second conductive portion 512 are short-circuited through the area S, due to a slot formed between the first conductive plate 551 and the second conductive portion 512, a current induced into the slot may occur from the first conductive portion 511 close to the first conductive plate 551 and the second conductive portion 512. Due to the induced current, the antenna radiation performance of the first conductive portion 511 may be deteriorated. In order to reduce degradation in the radiation performance of the first conductive portion 511, the first conductive plate 551 may be electrically separated from the second conductive portion 512 in the area S.

According to an embodiment, the first conductive plate 551 may be electrically disconnected from the plurality of conductive portions 511, 512, and 513. Since the first conductive plate 551 is electrically disconnected from the plurality of conductive portions 511, 512, and 513, the electrical interference with an antenna is reduced when at least one of the plurality of conductive portions 511, 512, and 513 operates as the antenna.

Figure 6:
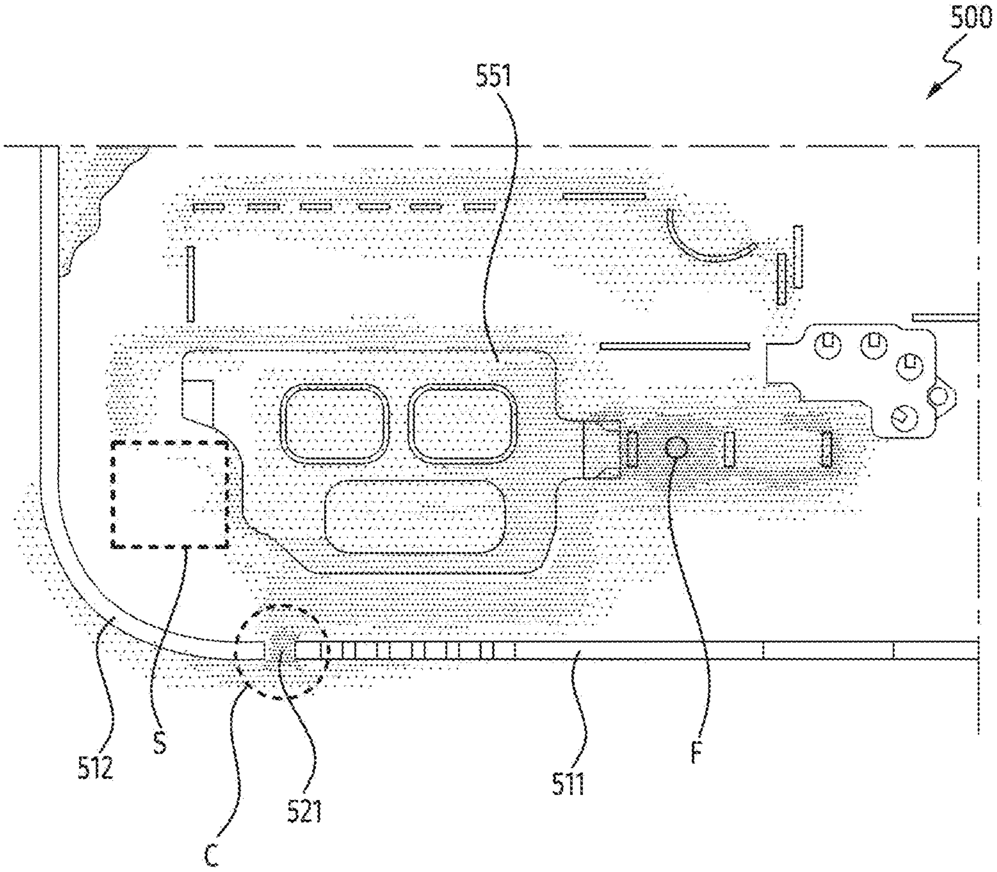
FIG. 6 is a diagram illustrating distribution of an electric field when a conductive portion of a housing operates as an antenna according to various embodiments.

FIG. 6 is a diagram illustrating distribution of an electric field when a conductive portion of a housing operates as an antenna according to various embodiments.

Referring to FIG. 6, distribution of an electric field when a first conductive plate 551 is short-circuited at a location adjacent to a second conductive portion 512 is illustrated.

When the first conductive plate 551 is supplied with current through a feeding point F, a strong electric field may be formed in an area C including a first non-conductive portion 521 between a first conductive portion 511 and a second conductive portion 512 of a housing 501. A current may flow along an area in which the first conductive plate 551 and the second conductive portion 512 are electrically short-circuited. The short-circuited area may be an area S. When the first conductive portion 511 operates as an antenna, current induced to the first conductive plate 551 connected to the second conductive portion 512 may be generated. In addition, a second conductive plate 552 disposed on a side of the first conductive plate 551 and a third conductive plate 553 disposed on a side of the second conductive plate 552 may be coupled to the first conductive plate to cause electrical interference.

According to an embodiment, the electronic device 500 may be connected to peripheral devices in order to reduce electrical interference caused by coupling between the first conductive plate 551 and the peripheral devices. The electronic device 500 may remove a short circuit for grounding in order to reduce the influence of the first conductive portion 511 or the second conductive portion 512 operating as an antenna. The electronic device 500 may arrange a ground point of the first conductive plate 551 far from the first conductive portion 511 and the second conductive portion 512.

Figure 7A:
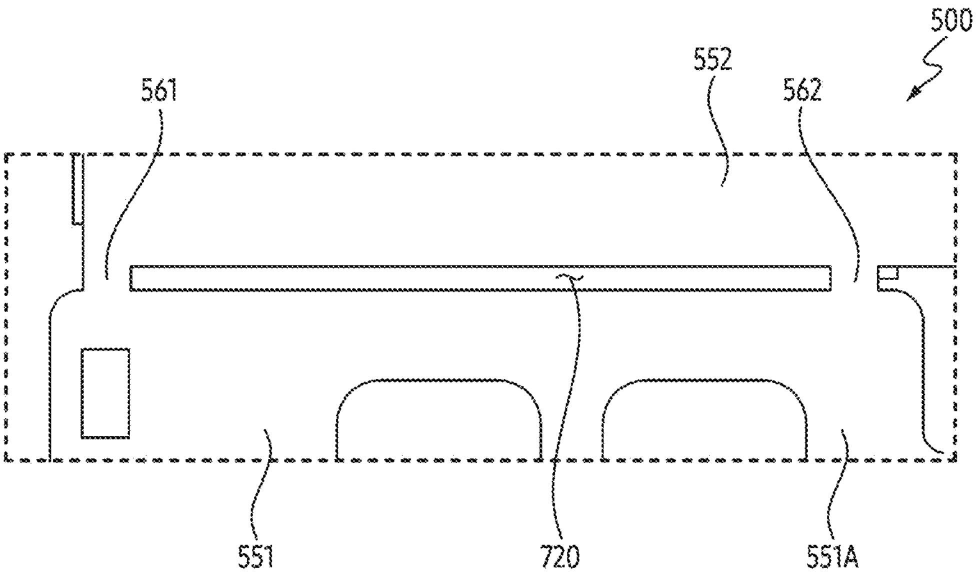
FIG. 7A is a diagram illustrating an enlarged view of portion B of the electronic device of FIG. 5 according to various embodiments.
Figure 7B:
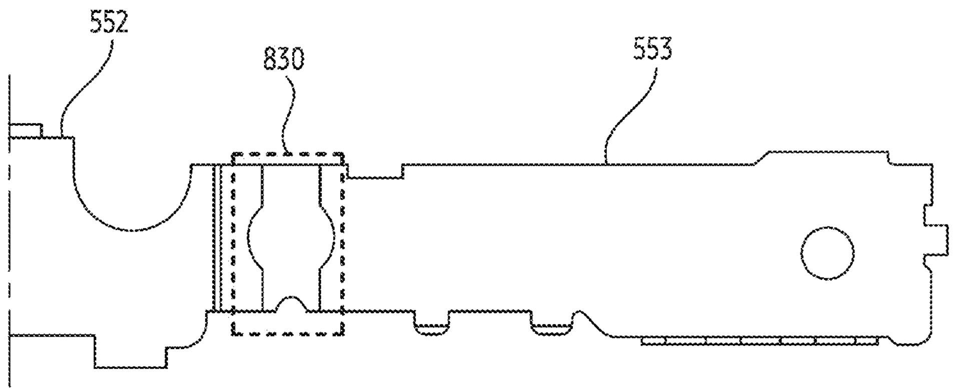
FIG. 7B is a diagram illustrating an enlarged view of portion C of the electronic device of FIG. 5, according to various embodiments.

FIG. 7A is a diagram illustrating an enlarged view of portion B of the electronic device of FIG. 5 according to various embodiments. FIG. 7B is a diagram illustrating an enlarged view of portion C of the electronic device of FIG. 5, according to various embodiments.

Referring to FIGS. 7A and 7B, a first conductive plate 551, a second conductive plate 552, and a third conductive plate 553 of the electronic device 500 may be connected to each other. The first conductive plate 551 and the second conductive plate 552 may be connected to each other by bridges 561 and 562. The second conductive plate 552 may be connected to the third conductive plate 553 through a connection portion 830. The first conductive plate 551, the second conductive plate 552, and the third conductive plate, which are connected, may provide a signal of a frequency band wider than an antenna radiator using only the first conductive plate 551. An antenna radiator using the first conductive plate 551, the second conductive plate 552, and the third conductive plate may increase a physical size to provide a signal of a wide frequency band. The radiator providing a signal of a wide frequency band may be used in a multi-band support antenna.

According to an embodiment, the bridges 561 and 562 connecting the first conductive plate 551 and the second conductive plate 552 may form a slot 720. For example, the first bridge 561 may connect an end of a side of the first conductive plate 551 facing the second conductive plate 552 and an end of a side of the second conductive plate 552 facing the first conductive plate 551. The second bridge 562 may connect another end of the side of the first conductive plate 551 to another end of the side of the second conductive plate 552.

According to an embodiment, the first bridge 561 and the second bridge 562 may be integrally formed with the first conductive plate 551 or the second conductive plate 552. For example, the first conductive plate 551 may have a groove at an edge of the first conductive plate 551 facing the second conductive plate 552, and have the first bridge 561 and the second bridge 562 on both sides of the groove.

According to an embodiment, the slot 720 may be formed by the first conductive plate 551, the second conductive plate 552, the first bridge 561, and the second bridge 562. For example, the first conductive plate 551 and the second conductive plate 552 may be spaced apart from each other to provide a space for the slot 720 to be formed. The first bridge 561 may close an end of the slot 720, and the second bridge 562 may close another end of the slot 720. According to an embodiment, an electrical length of the slot 720 may be adjusted by a location and width of the first bridge 561 and the second bridge 562. The length of the slot 720 may be related to a frequency band of electromagnetic waves radiated through the slot 720.

According to an embodiment, the slot 720 formed by connection of the first conductive plate 551, the second conductive plate 552, and/or the third conductive plate 553 may be disposed on an antenna structure formed by the first conductive plate 551, the second conductive plate 552, and/or the third conductive plate 553. A slotted planar inverse F antenna (PIFA) structure may be provided through a feeding point (e.g., the feeding point F of FIG. 5) and a ground point located on an antenna structure including the conductive plates 551, 552, and 553. The antenna structure may be configured to provide additional resonance by providing a structure in which a slot is disposed inside the conductive plates 551, 552, and 553. The antenna structure may additionally provide a signal of an additional frequency band due to the resonance generated by the slot 720. According to an embodiment, the antenna structure may support a signal of multiple frequency band by connecting the conductive plates 551 and 552 and forming a slot instead of using conductive portions (e.g., conductive portions 511, 512, and 513 of FIG. 5) as a radiator, for a large-area radiator configuration.

According to an embodiment, the second conductive plate 552 may be connected to the third conductive plate 553 through the connection portion 830. The connection portion 830 may include an additional conductive member. The connection portion 830 may electrically connect the second conductive plate 552 and the third conductive plate 553 to operate as an antenna radiator.

The antenna structure according to the above-described embodiment may increase volume of a radiator by connecting the conductive plates 551, 552, and 553. The antenna structure may provide a broadband or multi-band antenna structure with a slot 720 formed by the increased radiator and bridges 561 and 562 for connecting conductive plates 551, 552, and 553.

Figure 8:
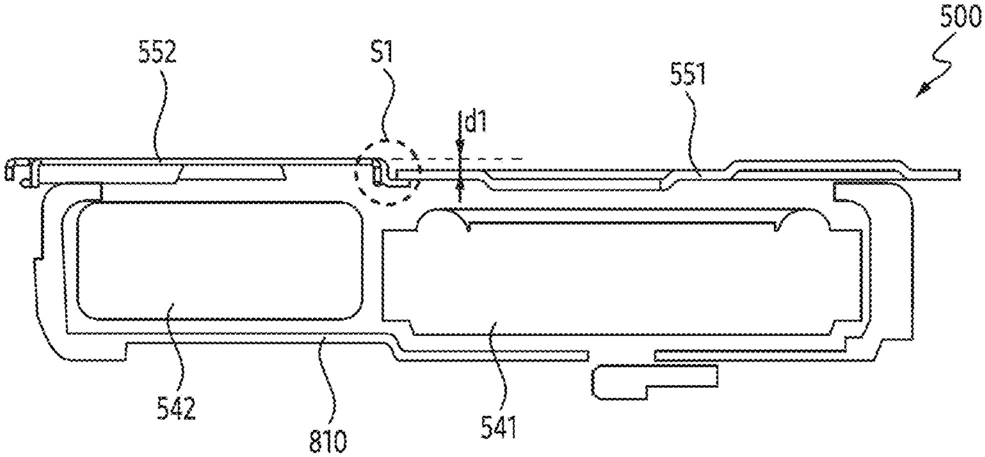
FIG. 8 is a cross-sectional view illustrating an arrangement of electronic components and conductive plates according to various embodiments.

FIG. 8 is a cross-sectional view illustrating an arrangement of electronic components and conductive plates according to various embodiments.

Referring to FIG. 8, an electronic device 500 may include a first electronic component 541, a second electronic component 542, a first conductive plate 551, and a second conductive plate 552. The first electronic component 541 may be a speaker module, and the second electronic component 542 may be a motor. The first conductive plate 551 may reduce vibration caused by an echo of a resonance chamber of the first electronic component 541, which is a speaker module. The second conductive plate 552 may reduce vibration caused by a rotation of the second electronic component 542, which is a motor. The first electronic component 541 or the second electronic component 542 has been described as a speaker module or a motor, but is not limited thereto and may be an electronic device requiring fixing. For example, it may be a cable that requires a pressing member to maintain fastening of the cable. The conductive plates 551 and 552 may be the pressing member disposed to fix the cable.

According to an embodiment, the first electronic component 541 and the second electronic component 542 may be disposed on a support member 810. The first electronic component 541 may be disposed between the support member 810 and the first conductive plate 551, and the second electronic component 542 may be disposed between the support member 810 and the second conductive plate 552. The first electronic component 541 may be fixed at a designated location inside the electronic device 500 by the support member 810 and the first conductive plate 551. The second electronic component 542 may be fixed at a designated location inside an electronic device 500 by the support member 810 and the second conductive plate 552.

A distance between the first conductive plate 551 and a printed circuit board (e.g., the printed circuit board 530 of FIG. 5) or the support member 810 may be different from a distance between the second conductive plate 552 and the printed circuit board or the support member 810. The first conductive plate 551 and the second conductive plate 552 may have a step due to a difference in heights of the first electronic component 541 and the second electronic component 542. For example, a height difference between the first conductive plate 551 and the second conductive plate 552 may be a distance d1. A height of the first electronic component 541 from the support member 810 may be different from a height of the second electronic component 542 from the support member 810. According to the height difference, a surface formed by the first conductive plate 551 for fixing the first electronic component 541 may be spaced apart from a surface formed by the second conductive plate 552 for fixing the second electronic component 542 by the distance d1. A slot (e.g., the slot 720 of FIG. 7A) may be formed in a step portion S1 located at a boundary between the first conductive plate 551 and the second conductive plate 552 by bridges (e.g., the first bridge 561 and the second bridge 562 of FIG. 7A).

In the electronic device 500 according to the above-described embodiment, a step may be formed at a connection portion or a boundary portion of the conductive plates 551 and 552 supporting the electronic components due to different heights of the electronic components 541 and 542. The electronic device 500 may provide a 3D slot shape by providing a structure with a slot in a portion on which a step is formed.

Figure 9:
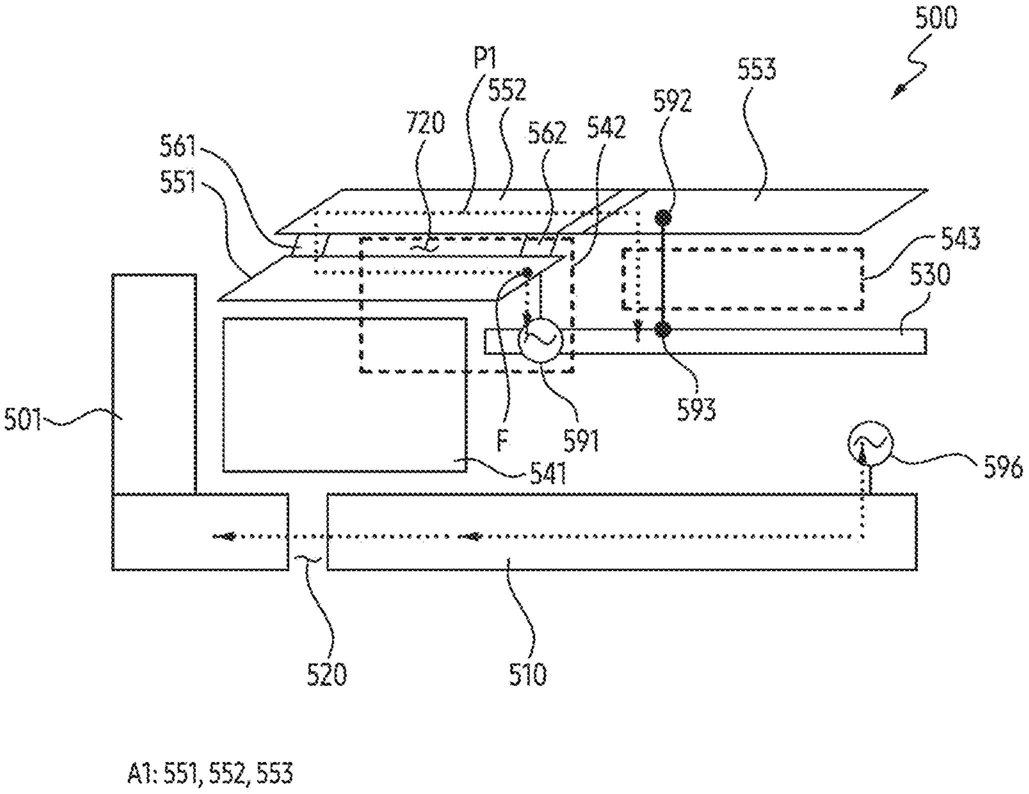
FIG. 9 is a graph illustrating an arrangement of electronic components, conductive plates, a printed circuit board, and a conductive portion of a housing, according to various embodiments.

FIG. 9 is a diagram illustrating an example arrangement of electronic components, conductive plates, a printed circuit board, and a conductive portion of a housing, according to various embodiments.

Referring to FIG. 9, an electronic device 500 may include a housing 501, a first electronic component 541, a second electronic component 542, a third electronic component 542, a first conductive plate 551, a second conductive plate 552, and a third conductive plate 553.

As described in FIGS. 5, 7A, 7B, and 8, the first conductive plate 551, the second conductive plate 552, and the third conductive plate 553 may operate as an antenna radiator A1.

According to an embodiment, the electronic device 500 may further include a printed circuit board 530 and a processor or wireless communication circuitry electrically connected to the printed circuit board 530. A processor 580 or the wireless communication circuitry may be operably connected to the antenna radiator A1. A feeding point F of the first conductive plate 551 of the antenna radiator A1 may be electrically connected to a feeding portion 591 of the printed circuit board 530. The first conductive plate 551 may be connected to a wireless communication circuitry through the feeding portion 591, and may operate as an antenna radiator capable of transmitting and receiving a wireless communication signal. The first conductive plate 551 may be connected to the second conductive plate 552 through a first bridge 561 and a second bridge 562. The second conductive plate 552 may be connected to the third conductive plate 553 through a connection portion 830.

According to an embodiment, the third conductive plate 553 may be electrically connected to the printed circuit board 530. For example, a ground point 592 of the third conductive plate 553 may be electrically connected to a ground pad 593 of the printed circuit board 530. The ground point 592 and the ground pad 593 may be electrically connected by a conductive structure such as a C-clip, a conductive spring, a conductive tape, or a contact.

According to an embodiment, an electrical path P1 formed in the antenna radiator A1 may be a path through which a current flows from the feeding portion 591 along the feeding point F, the first conductive plate 551, the bridges 561 and 562, the second conductive plate 552, the third conductive plate 553, the ground point 592, and the ground pad 593.

According to an embodiment, the first conductive portion 510 may be connected to a wireless communication circuitry through a feeding portion 596 of a segmented antenna, and may operate as an antenna radiator capable of transmitting and receiving a wireless communication signal. In order to reduce the influence by an antenna operated by the conductive portion 510 separated by a non-conductive portion 520 of the housing 501, the ground point 592 may be disposed at a location far from the housing 501. For example, the ground point 592 may be disposed on the third conductive plate 553 to reduce interference caused by the conductive portion 510.

Figure 10:
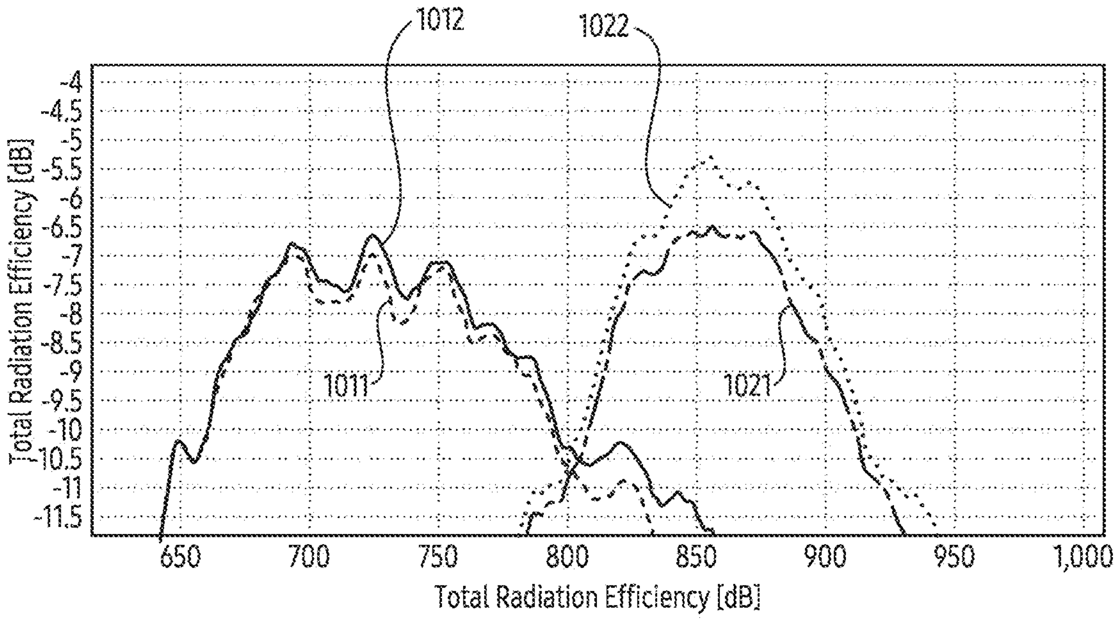
FIG. 10 is a graph illustrating radiation performance of an antenna of an electronic device and another antenna different from the antenna according to various embodiments.

FIG. 10 is a graph illustrating radiation performance of an antenna of an electronic device and another antenna different from the antenna according to various embodiments.

Referring to FIG. 10, a first graph 1011 and a second graph 1021 are graphs illustrating the performance when a first conductive plate (e.g., the first conductive plate 551 of FIG. 5) and a conductive portion (e.g., the conductive portion 510 of FIG. 5) of a housing (e.g., the housing 501 of FIG. 5) are short-circuited.

A third graph 1012 and a fourth graph 1022 are graphs illustrating the performance of an antenna using the conductive portion 510 when the first conductive plate 551 and the conductive portion 510 of the housing 501 are opened, as a radiator.

Referring to the first graph 1011 and the third graph 1012, antenna performance may be improved by approximately 0.5 dB in a relatively low frequency band (e.g., 700 MHz to 750 MHz) among a low band areas.

Referring to the second graph 1021 and the fourth graph 1022, antenna performance may be improved by approximately 1 dB in a relatively high frequency band (e.g., 820 MHz to 900 MHz) among the low band areas.

According to an embodiment, in a state in which the conductive portion 510 and the conductive portion 510 are short-circuited, corresponding to the first graph 1011 and the second graph 1021, interference between the conductive portion 510 and the first conductive plate 551 may be reduced. Due to the reduced interference, the performance of the antenna using the conductive portion 510 may be improved.

Figure 11A:
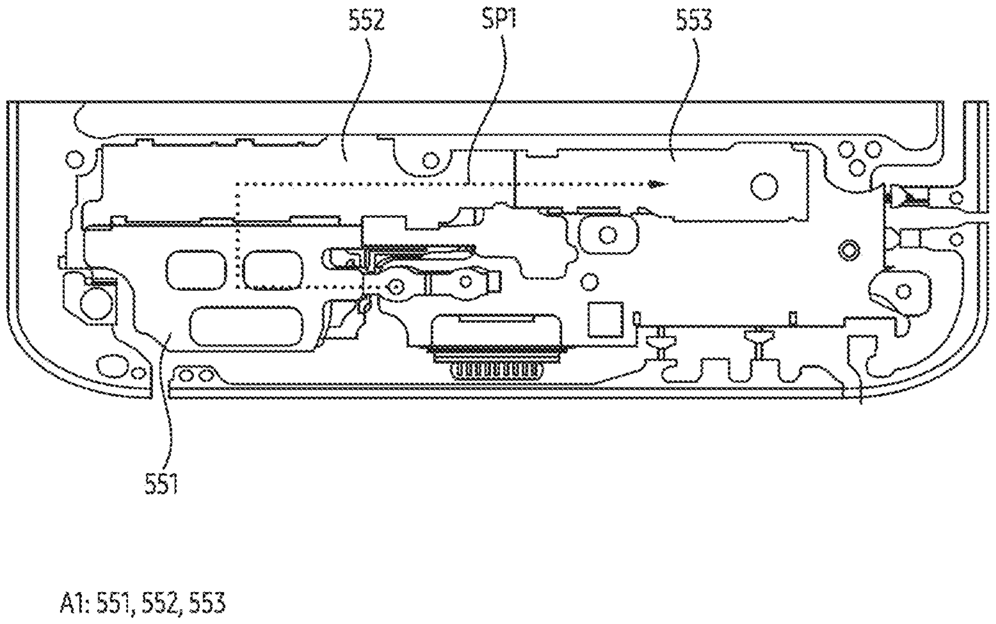
FIGS. 11A, 11B, and 11C are diagrams illustrating a flow of current according to a frequency band when conductive plates of an electronic device operate as an antenna, according to various embodiments.
Figure 11B:
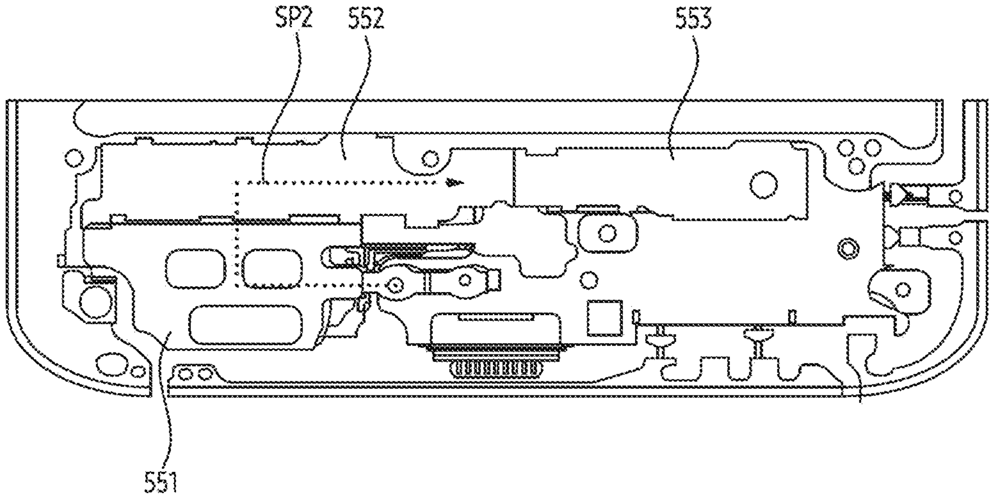
Figure 11C:
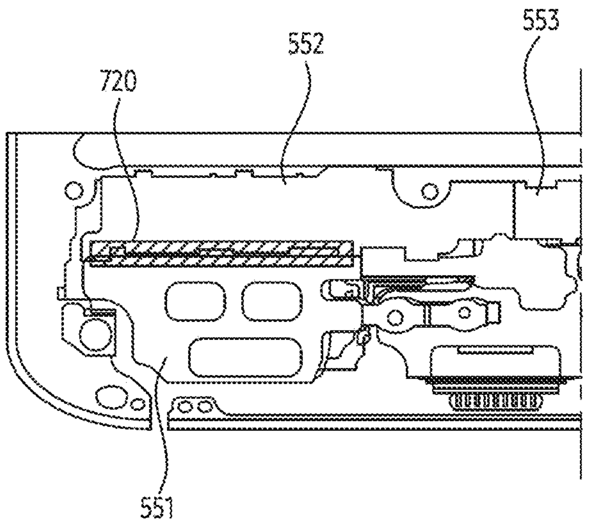

FIGS. 11A, 11B, and 11C are diagrams illustrating a flow of current according to a frequency band when conductive plates of an electronic device operate as an antenna, according to various embodiments.

An antenna radiator A1 may be formed of a first conductive plate 551, a second conductive plate 552, and a third conductive plate 553. The antenna radiator A1 may be formed of a plurality of conductive plates, thereby providing a signal in a wide frequency band. For example, various current paths may be provided to the antenna radiator A1 according to a frequency band.

Referring to FIG. 11A, when a frequency band of a signal applied to the antenna radiator A1 is approximately 2 GHz, an electrical path SP1 formed in the antenna radiator A1 may be formed along the first conductive plate 551, the second conductive plate 552, and the third conductive plate 553. According to an embodiment, a processor (e.g., the processor 120 of FIG. 1, the first communication processor 212 of FIG. 2 or the second communication processor 214 of FIG. 2) or a wireless communication circuitry operably connected to the antenna radiator A1 may transmit or receive a signal of a first frequency band (e.g., approximately 2 GHz) to or from an external electronic device, through the first conductive plate 551, the second conductive plate 552, and the third conductive plate 553.

Referring to FIG. 11B, when the frequency band of the signal applied to the antenna radiator A1 is approximately 3 GHz, an electrical path SP2 formed in the antenna radiator A1 may be formed along the first conductive plate 551 and the second conductive plate 552. According to an embodiment, the processor 120 or the wireless communication circuitry may transmit or receive a signal of a second frequency band (e.g., approximately 3 GHz) to or from an external electronic device, through the first conductive plate 551 and the second conductive plate 552.

Referring to FIG. 11C, when the frequency band of the signal applied to the antenna radiator A1 is approximately 4.2 GHz, current may be concentrated in the slot 720 of the antenna radiator A1. According to an embodiment, the processor 120 or the wireless communication circuitry may transmit or receive a signal of a third frequency band (e.g., approximately 4.2 GHz) to or from an external electronic device, through the slot 720 of the antenna radiator A1.

According to the above-described embodiment, an electronic device (e.g., the electronic device 101 of FIG. 1 or the electronic device 500 of FIG. 5) may support multiple bands by providing a large-area antenna radiator structure. The electronic device 500 may provide a structure capable of providing a signal of an ultra-high frequency area (e.g., an NR band) by providing a slot as illustrated in FIG. 11C.

Figure 12A:
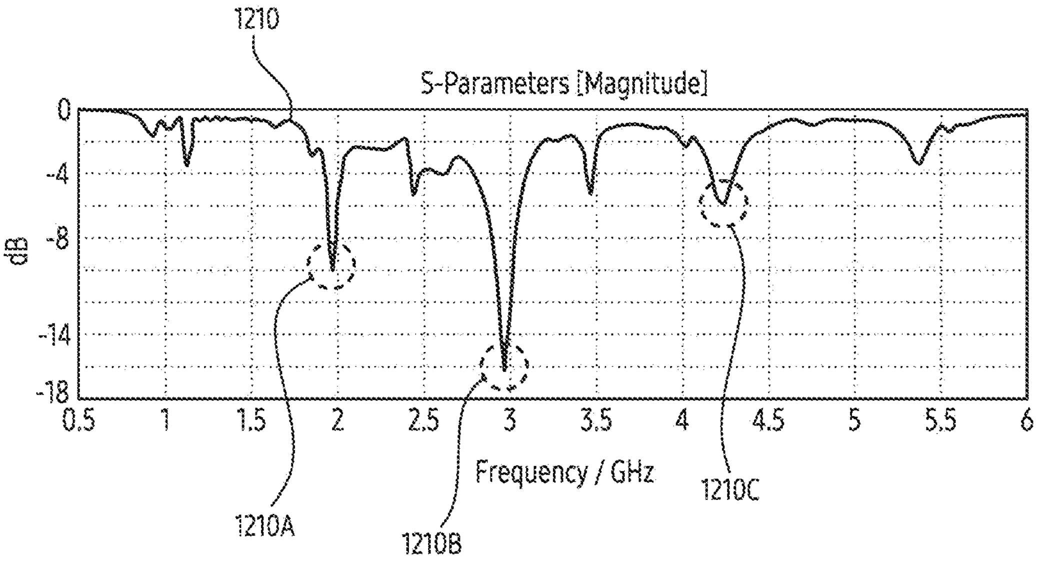
FIGS. 12A, 12B, and 12C are graphs illustrating radiation performance of an antenna including conductive plates according to a frequency of an electronic device, according to various embodiments.
Figure 12B:
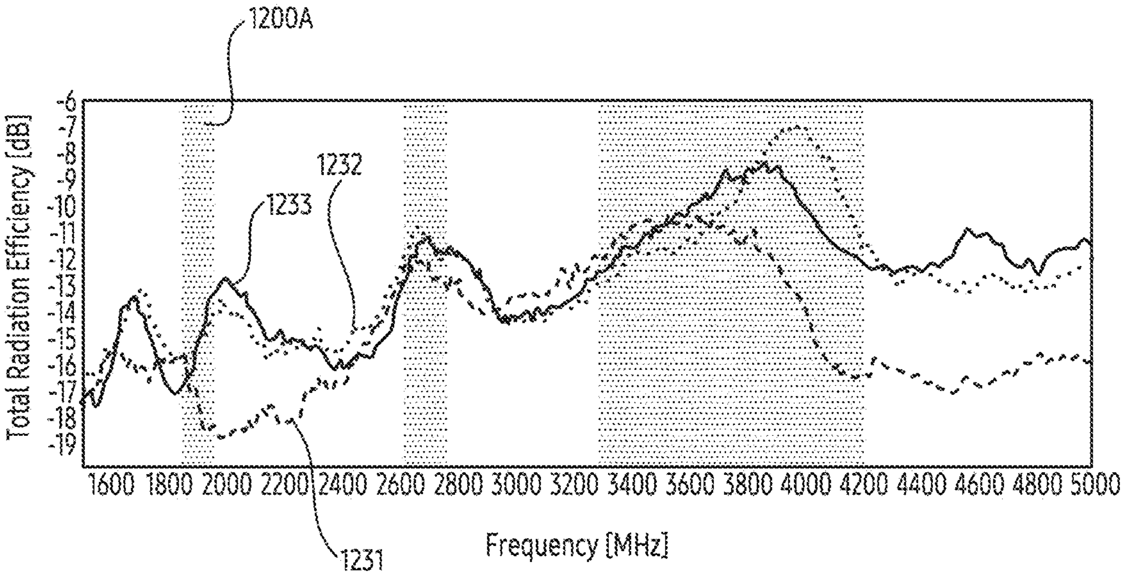
Figure 12C:
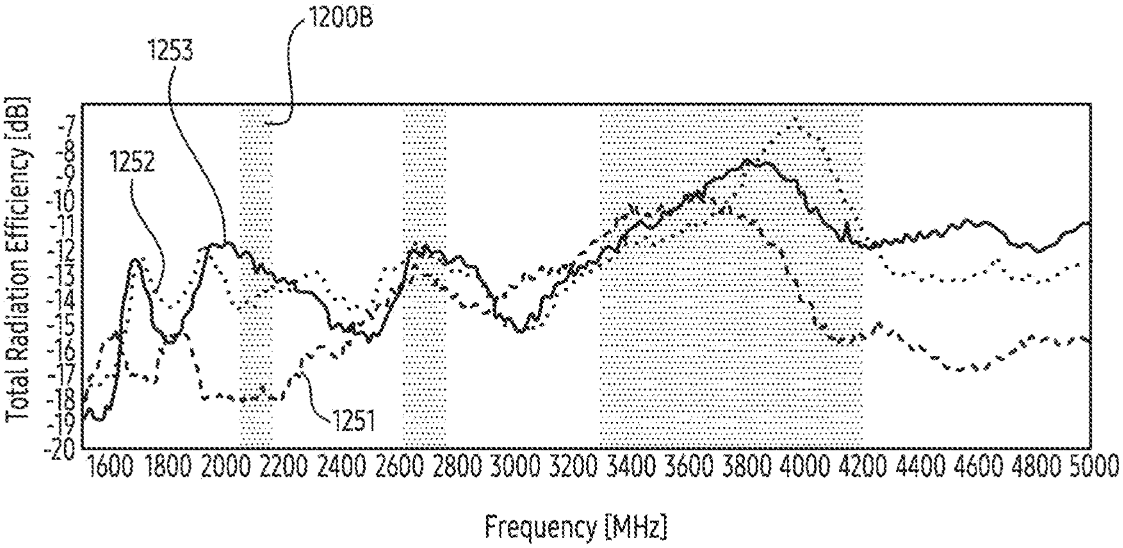

FIGS. 12A, 12B, and 12C are graphs illustrating radiation performance of an antenna including conductive plates according to a frequency of an electronic device, according to various embodiments.

Referring to FIG. 12A, a graph 1210 illustrates performance of an antenna radiator (e.g., the antenna radiator of FIG. 9) according to a frequency band.

In a first frequency band 1210A including 2 GHz, which shows a current flow along the electrical path SP1 of FIG. 11A, it may be seen that the amount of reflected signals is less than other frequency bands around 2 GHz.

In a second frequency band 1210B including 3 GHz, which shows a current flow along the electrical path SP2 of FIG. 11B, it may be seen that the amount of reflected signals is less than other frequency bands around 3 GHz.

In a third frequency band 1210C including 4.2 GHz, which shows a current flow concentrated in a slot as illustrated in FIG. 11C, it can be seen that the amount of reflected signal is less than other frequency bands around 4.2 GHz.

Since the above-described first frequency band 1210A, second frequency band 1210B, and third frequency band 1210C have less amount of signal reflected than other surrounding areas and transmit the signal to the outside, signal transmission efficiency may be higher than other frequency bands.

Referring to FIG. 12B, a graph 1231 illustrates signal efficiency in case that a first conductive plate (e.g., the first conductive plate 551 of FIG. 5) and a conductive portion (e.g., the second conductive portion 512 of FIG. 5) are electrically short-circuited. A graph 1232 illustrates signal efficiency in case that the first conductive plate 551 and the second conductive portion 512 are electrically opened. A graph 1233 illustrates signal efficiency in case that impedance (e.g., connecting a capacitor of 10 pf and an inductor of 8.2 nH) is adjusted to the antenna including the first conductive plate 551.

In the b3 frequency band 1200A (e.g., 1.8 GHz), it may be seen that gain of the graph 1231 when the first conductive plate 551 and the second conductive portion 512 are short-circuited is lower than other two graphs 1232 and 1233. According to the influence of signal interference due to a short circuit between the first conductive plate 551 and the second conductive portion 512, the gain of the graph 1231 may be low.

Referring to FIG. 12C, a graph 1251 illustrates signal efficiency in case that a first conductive plate (e.g., the first conductive plate 551 of FIG. 5) and a conductive portion (e.g., the second conductive portion 512 of FIG. 5) are electrically short-circuited. A graph 1252 illustrates signal efficiency in case that the first conductive plate 551 and the second conductive portion 512 are electrically opened. A graph 1253 illustrates signal efficiency in case that impedance (e.g., connecting a capacitor of 10 pf and an inductor of 8.2 nH) is adjusted to the antenna including the first conductive plate 551.

In the b1 frequency band 1200B (e.g., 2.1 GHz), it may be seen that the gain of the graph 1251 when the first conductive plate 551 and the second conductive portion 512 are short-circuited is lower than other two graphs 1252 and 1253. According to the influence of signal interference due to a short circuit between the first conductive plate 551 and the second conductive portion 512, the gain of the graph 1251 may be low.

Referring to FIGS. 12B and 12C together, in the b3 frequency band 1200A, the graph 1233 representing a case in which impedance is adjusted may have a lower gain than the graph 1232 representing a case in which impedance is not connected. In the b1 frequency band 1200B, the graph 1253 indicating a case in which the impedance is adjusted may have a higher gain than the graph 1252 indicating a case in which the impedance is not connected.

As shown in the above-described graph, an antenna radiator may be used by adjusting impedance according to a frequency band adopted in the electronic device. A metal portion of a housing used as a segmented portion antenna and an open antenna radiator may have a high gain in the overall frequency band.

Figure 13:
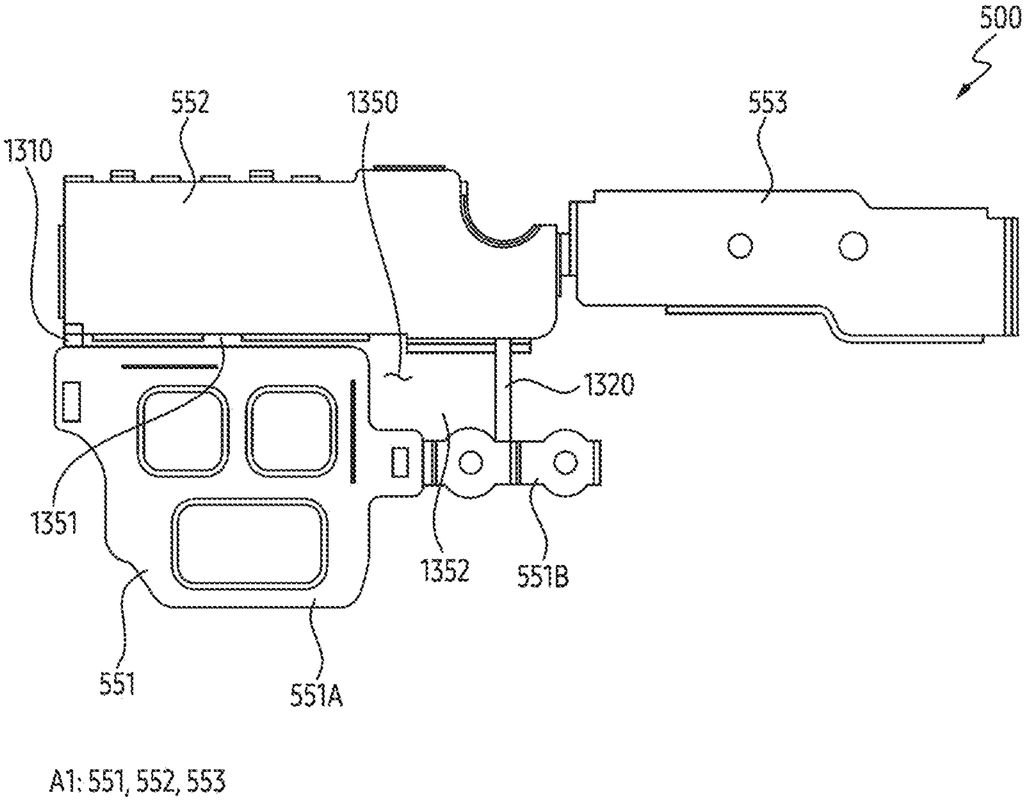
FIG. 13 illustrates an example of a connection structure of conductive plates of an electronic device according to various embodiments.

FIG. 13 is a diagram illustrating an example of a connection structure of conductive plates of an electronic device according to various embodiments.

Referring to FIG. 13, an electronic devices 500 may include a first conductive plate 551, a second conductive plate 552, and a third conductive plate 553. A first bridge 1310 may connect a body portion 551A of the first conductive plate 551 to the second conductive plate 552. A second bridge 1320 may connect an extension portion 551B of the first conductive plate 551 to the second conductive plate 552.

According to an embodiment, an antenna radiator A1 may utilize a first space 1351 between the body portion 551A of the first conductive plate 551 and the second conductive plate 552 and a second space 1352 between the extension portion 551B of the first conductive plate 551 and the second conductive plate 552, as a slot antenna. The slot 720 of FIG. 7A or FIG. 9 may have a short length slot by utilizing the first space 1351, and the slot 1350 according to an embodiment may have a longer length slot by including the first space 1351 and the second space 1352. The relatively long slot 1350 according to an embodiment may transmit a signal of a lower frequency band than the slot 720 of FIG. 7A or FIG. 9.

Figure 14:
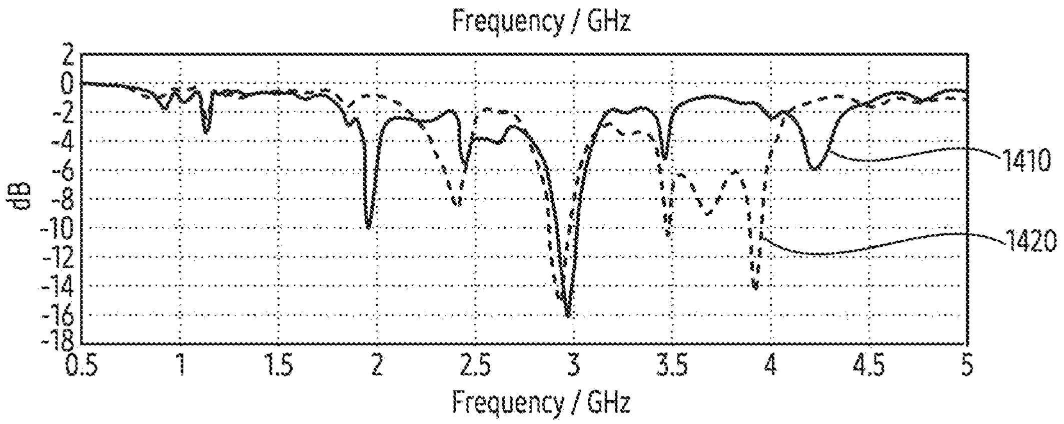
FIG. 14 is a graph illustrating radiation performance according to a length of a slot formed by conductive plates of an electronic device according to various embodiments.

FIG. 14 is a graph illustrating radiation performance according to a length of a slot formed by conductive plates of an electronic device according to various embodiments.

Referring to FIG. 14, a graph 1410 represents an S-parameter graph in case that a width of a slot (e.g., the slot 720 of FIG. 7A or the slot 1350 of FIG. 13) is approximately 13.8 mm. A graph 1420 represents an S-parameter graph in case that a width of the slot 720 or 1350 are approximately 21.7 mm.

According to an embodiment, based on a designed width of the slot 720 or 1350, a frequency band in which resonance occurs may move. For example, as the width of the slot increases, a resonant frequency of approximately 4.2 GHz of the graph 1410 may shift to a resonant frequency of approximately 3.8 GHz of the graph 1420.

An antenna in a NR band may be tuned by adjusting a width of a slot. An electronic device (e.g., the electronic device 500 of FIG. 13) may provide a slot antenna that operates in a relatively low band, when a the bridges 1310 and 1320 of FIG. 13 have a wide width. An electronic device (e.g., the electronic device 500 of FIG. 5) may provide a slot antenna that operates in a relatively high band, when a width is formed narrow such as the bridges 561 and 562 of FIG. 7A.

According to an example embodiment, an electronic device (e.g., the electronic device 101 of FIG. 1 or the electronic device 500 of FIG. 5) may include: a printed circuit board (e.g., the printed circuit board 530 of FIG. 5) including wireless communication circuitry, a first electronic component (e.g., the first electronic component 541 of FIG. 5) electrically connected to the printed circuit board, and a second electronic component (e.g., the second electronic component 542 of FIG. 5) electrically connected to the printed circuit board and spaced apart from the first electronic component.

According to an example embodiment, the electronic device may comprise: a first conductive plate (e.g., the first conductive plate 551 of FIG. 5) supporting the first electronic component, operably connected to the wireless communication circuitry, and including a feeding point electrically connected to the printed circuit board, and a second conductive plate (e.g., the second conductive plate 552 of FIG. 5), spaced apart from the first conductive plate to form a slot (e.g., the slot 720 of FIG. 7A), and supporting the second electronic component.

According to an example embodiment, the slot may comprise a plurality of bridges (e.g., the first bridge 561 and the second bridge 562 of FIG. 7A) disposed between the first conductive plate and the second conductive plate.

According to an example embodiment, the wireless communication circuitry may be configured to communicate with an external electronic device through at least one frequency band using the first conductive plate and the second conductive plate.

According to an example embodiment, the electronic device may further include a housing (e.g., the housing 501 of FIG. 5) including a first conductive portion (e.g., the first conductive portion 511 of FIG. 5), a second conductive portion (e.g., the second conductive portion 512 of FIG. 5) spaced apart from the first conductive portion, and a non-conductive portion (e.g., the first non-conductive portion 521 of FIG. 5) disposed between the first conductive portion and the second conductive portion.

According to an example embodiment, the wireless communication circuitry may be configured to communicate with an external electronic device through the first conductive portion or the second conductive portion.

According to an example embodiment, the first conductive plate may be electrically separated from the conductive portion (e.g., the conductive portion 510 of FIG. 5).

According to an example embodiment, the electronic device may further include a third electronic component electrically connected to the printed circuit board and facing a side of the second electronic component, and a third conductive plate connected to the second conductive plate and supporting the third electronic component.

According to an example embodiment, the third conductive plate may be electrically connected to a ground portion of the printed circuit board spaced apart from the conductive portion.

According to an example embodiment, a distance between the ground portion and the first conductive portion may be greater than a distance between the first conductive plate and the first conductive portion.

According to an example embodiment, the wireless communication circuitry may be configured to communicate with an external electronic device, through the first conductive plate, the second conductive plate, and the third conductive plate.

According to an example embodiment, a height from the printed circuit board to the first conductive plate may be different from a height from the printed circuit board to the second conductive plate.

According to an example embodiment, the wireless communication circuitry may be configured to receive from the external electronic device a signal of a first frequency band or transmit to the external electronic device a signal of a first frequency band, through the first conductive plate and the second conductive plate, and receive from the external electronic device a signal of a second frequency band or transmit to the external electronic device a signal of a second frequency band through the slot between the first conductive plate and the second conductive plate.

According to an example embodiment, the second frequency band may be determined by a length of the slot.

According to an example embodiment, the first electronic component and the second electronic component may include one of a speaker module, a motor, and a cable to cable (CTC) connector.

According to an example embodiment, the first conductive plate may include a body portion supporting the first electronic device, and an extension portion extending from the body portion to the printed circuit board.

According to an example embodiment, the body portion may overlap the first electronic device, and the extension portion may overlap the printed circuit board.

According to an example embodiment, the feeding point may be disposed in the extension portion and electrically connected to the printed circuit board through a connector.

According to an example embodiment, the plurality of bridges may include a first bridge (e.g., the first bridge 561 of FIG. 7A) connecting the body portion and the second conductive plate and a second bridge (e.g., the second bridge 562 of FIG. 7A) connecting the extension portion and the second conductive plate.

According to an example embodiment, the slot may be surrounded by the first bridge, the second bridge, the body portion, the extension portion, and the second conductive plate.

According to an example embodiment, the slot may be surrounded by the first bridge, the second bridge, the body portion, and the second conductive plate. The first bridge may face the second bridge, and the body portion may face the second conductive plate.

According to an example embodiment, the first conductive plate may overlap a portion of the printed circuit board, and may be electrically connected to the printed circuit board through a connector.

According to an example embodiment, the connector may include one of a C-clip, a conductive spring, and a conductive tape.

According to an example embodiment, an electronic device may comprise: a housing (e.g., the housing 501 of FIG. 5) including a plurality of conductive portions and a plurality of non-conductive portions disposed between the plurality of conductive portions, a bracket (e.g., the support member 810 of FIG. 8) disposed in the housing, a printed circuit board (e.g., the printed circuit board 530 of FIG. 5) supported by a support and including wireless communication circuitry, a first electronic component (e.g., the first electronic component 541 of FIG. 5) electrically connected to the printed circuit board and disposed on the printed circuit board, a second electronic component (e.g., the second electronic component 542 of FIG. 5) electrically connected to the printed circuit board, disposed on the printed circuit board, and facing a side of the first electronic component, a first conductive plate (e.g., the first conductive plate 551 of FIG. 5) supporting the first electronic component, electrically connected to the printed circuit board, and not electrically to the plurality of conductive portions, a second conductive plate (e.g., the second conductive plate 552 of FIG. 5) spaced apart from the first conductive plate and supporting the second electronic component, and a plurality of bridges (e.g., the bridges 561 and 562 of FIG. 7A) connecting the first conductive plate and the second conductive plate to form a slot.

The wireless communication circuitry may be operably connected to the first conductive plate, and configured to communicate with an external electronic device in a first frequency band through the first conductive plate and the second conductive plate, and to communicate with an external electronic device in a second frequency band through at least one of the conductive portions.

According to an example embodiment, the electronic device may further include a third electronic component electrically connected to the printed circuit board and facing a side of the second electronic component, and a third conductive plate connected to the second conductive plate and supporting the third electronic component.

According to an example embodiment, the third conductive plate may be connected to a ground pad of the printed circuit board to be connected to a ground portion of the printed circuit board.

According to an example embodiment, a height from the printed circuit board to the first conductive plate may be different from a height from the printed circuit board to the second conductive plate.

According to an example embodiment, the first conductive plate may include a body portion overlapping the first electronic device, and an extension portion extending from the body portion to the printed circuit board and disposed on the printed circuit board.

According to an example embodiment, the plurality of bridges may include a first bridge (e.g., the first bridge 561 of FIG. 7A) connecting the body portion and the second conductive plate and a second bridge (e.g., the second bridge 562 of FIG. 7A) connecting the extension portion and the second conductive plate.

According to an example embodiment, the slot may be formed by the first bridge, the second bridge, the body portion, the extension portion, and the second conductive plate.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

No claim element is to be construed under the provisions of 35 U.S.C. § 112, sixth paragraph, unless the element is expressly recited using the phrase "means for" or "means".

What is claimed is:

1. An electronic device comprising:

a printed circuit board;

a first electronic component electrically connected to the printed circuit board;

a second electronic component electrically connected to the printed circuit board and facing a side of the first electronic component;

a first conductive plate supporting the first electronic component and including a feeding point electrically connected to the printed circuit board;

a second conductive plate supporting the second electronic component and spaced apart from the first conductive plate;

a plurality of bridges connecting the first conductive plate and the second conductive plate to form a slot; and wireless communication circuitry electrically connected to the printed circuit board and configured to communicate with an external electronic device through at least one frequency band using the first conductive plate and the second conductive plate.

2. The electronic device of claim 1, further comprising: a housing including a first conductive portion, a second conductive portion spaced apart from the first conductive portion and a non-conductive portion disposed between the first conductive portion and the second conductive portion, wherein the wireless communication circuitry is configured to communicate with the external electronic device through the first conductive plate and the second conductive plate, and wherein the first conductive plate is electrically disconnected from the first conductive portion and the second conductive portion.

3. The electronic device of claim 2, wherein a distance between a ground portion of the printed circuit board electrically connected to an antenna operated by the first conductive plate and the second conductive plate and the first conductive portion is greater a distance between the first conductive plate and the first conductive portion.

4. The electronic device of claim 1, further comprising:

a third electronic component electrically connected to the printed circuit board and facing a side of the second electronic component; and a third conductive plate supporting the third electronic component and connected to the second conductive plate.

5. The electronic device of claim 4, wherein the third conductive plate is electrically connected to the ground portion of the printed circuit board.

6. The electronic device of claim 4, wherein the wireless communication circuitry is configured to communicate with the external electronic device through the first conductive plate, the second conductive plate, and the third conductive plate.

7. The electronic device of claim 1, wherein a height from the printed circuit board to the first conductive plate is different from a height from the printed circuit board to the second conductive plate.

8. The electronic device of claim 1, wherein the wireless communication circuitry is configured to:

receive from the external electronic device a signal of a first frequency band and/or transmit to the external electronic device a signal of a first frequency band, through the first conductive plate and the second conductive plate; and receive from the external electronic device a signal of a second frequency band or transmit to the external electronic device a signal of a second frequency band through the slot between the first conductive plate and the second conductive plate.

9. The electronic device of claim 8, wherein the second frequency band is related to a length of the slot.

10. The electronic device of claim 1, wherein the first electronic component and the second electronic component include one of a speaker module comprising a speaker, a motor, and a cable to cable (CTC) connector.

11. The electronic device of claim 1, wherein the first conductive plate includes a body portion overlapping the first electronic component; and an extension portion extending from the body portion to the printed circuit board.

12. The electronic device of claim 11, wherein the feeding point is disposed on the extension portion and electrically connected to the printed circuit board through a connector.

13. The electronic device of claim 11, wherein the plurality of bridges include:

a first bridge connecting to the body portion and the second conductive plate; and a second bridge connecting to the extension portion and the second conductive plate, and wherein the slot is surrounded by the first bridge, the second bridge, the body portion, the extension portion and the second conductive plate.

14. The electronic device of claim 11, wherein the plurality of bridges include:

a first bridge connecting the body portion and the second conductive plate; and a second bridge connecting the body portion and the second conductive plate, the second bridge spaced apart from the first bridge, and wherein the slot is surrounded by the first bridge, the second bridge, the body portion and the second conductive plate.

15. The electronic device of claim 1, wherein the first conductive plate is electrically connected to the printed circuit board through a connector and overlapping a portion of the printed circuit board, and wherein the connector includes one of a C-clip, a conductive spring, or a conductive tape.

16. An electronic device comprising:

a housing including a plurality of conductive portions and a plurality of non-conductive portions disposed between the plurality of conductive portions;

a bracket disposed in the housing;

a printed circuit board including at least one wireless communication circuit and supported by the bracket;

a first electronic component electrically connected to the printed circuit board and disposed on the printed circuit board;

a second electronic component electrically connected to the printed circuit board, disposed on the printed circuit board and facing a side of the first electronic component;

a first conductive plate supporting the first electronic component, electrically connected to the printed circuit board, and electrically disconnected to the plurality of the conductive portions;

a second conductive plate supporting the second electronic component, and spaced apart from the first conductive plate; and a plurality of bridges connected between the first conductive plate and the second conductive plate to form a slot;

wherein the wireless communication circuit is configured to:

communicate with an external electronic device through a first frequency band using the first conductive plate and the second conductive plate, and communicate with an external electronic device through a second frequency band using a conductive portion of the plurality of the conductive portions.

17. The electronic device of claim 16, further comprising:

a third electronic component electrically connected to the printed circuit board and facing a side of the second electronic component; and a third conductive plate supporting the third electronic component and connected to the second conductive plate.

18. The electronic device of claim 17, wherein the third conductive plate is electrically connected to a ground of the printed circuit board.

19. The electronic device of claim 16, wherein a height from the printed circuit board to the first conductive plate is different from a height from the printed circuit board to the second conductive plate.

20. The electronic device of claim 16, wherein the first conductive plate includes:

a body portion overlapping the first electronic component; and an extension portion extending from the body portion to the printed circuit board;

wherein the plurality of the bridges include:

a first bridge connecting the body portion and the second conductive plate; and a second bridge connecting the extension portion and the second conductive plate, and wherein the slot is surrounded by the first bridge, the second bridge, the body portion, the extension portion and the second conductive plate.

* * * * *